United States Patent
Horiguchi et al.

(10) Patent No.: US 7,787,828 B2
(45) Date of Patent: Aug. 31, 2010

(54) RADIO COMMUNICATION SYSTEM, RADIO TRANSMISSION APPARATUS AND RADIO RECEPTION APPARATUS

(75) Inventors: Tomoya Horiguchi, Kawasaki (JP); Koji Ogura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1163 days.

(21) Appl. No.: 11/375,094

(22) Filed: Mar. 15, 2006

(65) Prior Publication Data

US 2006/0234628 A1 Oct. 19, 2006

Related U.S. Application Data

(63) Continuation of application No. PCT/JP2006/300899, filed on Jan. 16, 2006.

(30) Foreign Application Priority Data

Jan. 18, 2005 (JP) .............................. 2005-010702

(51) Int. Cl.
*H04B 1/38* (2006.01)
(52) U.S. Cl. .................. 455/73; 455/59; 455/67.11; 455/69; 370/208; 370/319; 370/344; 714/748; 714/750; 714/751; 714/752
(58) Field of Classification Search .................. 455/59, 455/67.11, 73; 370/208, 319, 344; 714/748, 714/750, 751, 752
See application file for complete search history.

(56) References Cited

U.S. PATENT DOCUMENTS

2003/0236071 A1  12/2003  Ito

FOREIGN PATENT DOCUMENTS

| EP | 1 126 647 | * | 8/2001 |
|---|---|---|---|
| EP | 1 126 647 A1 | | 8/2001 |
| JP | 2003-218830 | | 7/2003 |
| JP | 2004-104574 | | 4/2004 |
| JP | 2004-179821 | | 6/2004 |

OTHER PUBLICATIONS

Ayanoglu, "Adaptive ARQ/FEC for Multitone Transmission in Wireless Networks," IEEE (1995), pp. 2278-2283.
Notification of Transmittal of the International Search Report and the Written Opinion of the International Searching Authority, International Search Report, and Written Opinion issued by the European Patent Office for International Patent Application No. PCT/JP2006/300899.
Notification of Reasons for Rejection mailed Sep. 16, 2008, in Japanese Patent Application No. 2005-010702 and translation thereof(4 pages).

* cited by examiner

*Primary Examiner*—Tuan H Nguyen
(74) *Attorney, Agent, or Firm*—Finnegan, Henderson, Farabow, Garrett & Dunner, L.L.P.

(57) ABSTRACT

Radio communication system includes radio transmitter containing unit dividing transmission data into first-code blocks each having N-bit data, unit adding error detection codes to first-code blocks, unit assigning first-code blocks to second-code blocks each including M carriers each having L symbols, and unit transmitting second-code blocks, and radio receiver containing unit receiving second-code blocks, unit converting second-code blocks into first-code blocks, based on values of M and L, unit subjecting first-coded blocks to error correction decoding, unit detecting error of code block of first-code blocks subjected to error correction decoding, unit generating retransmission-request signal for requesting retransmission of code block including error, if error is detected, and unit transmitting retransmission-request signal.

4 Claims, 21 Drawing Sheets

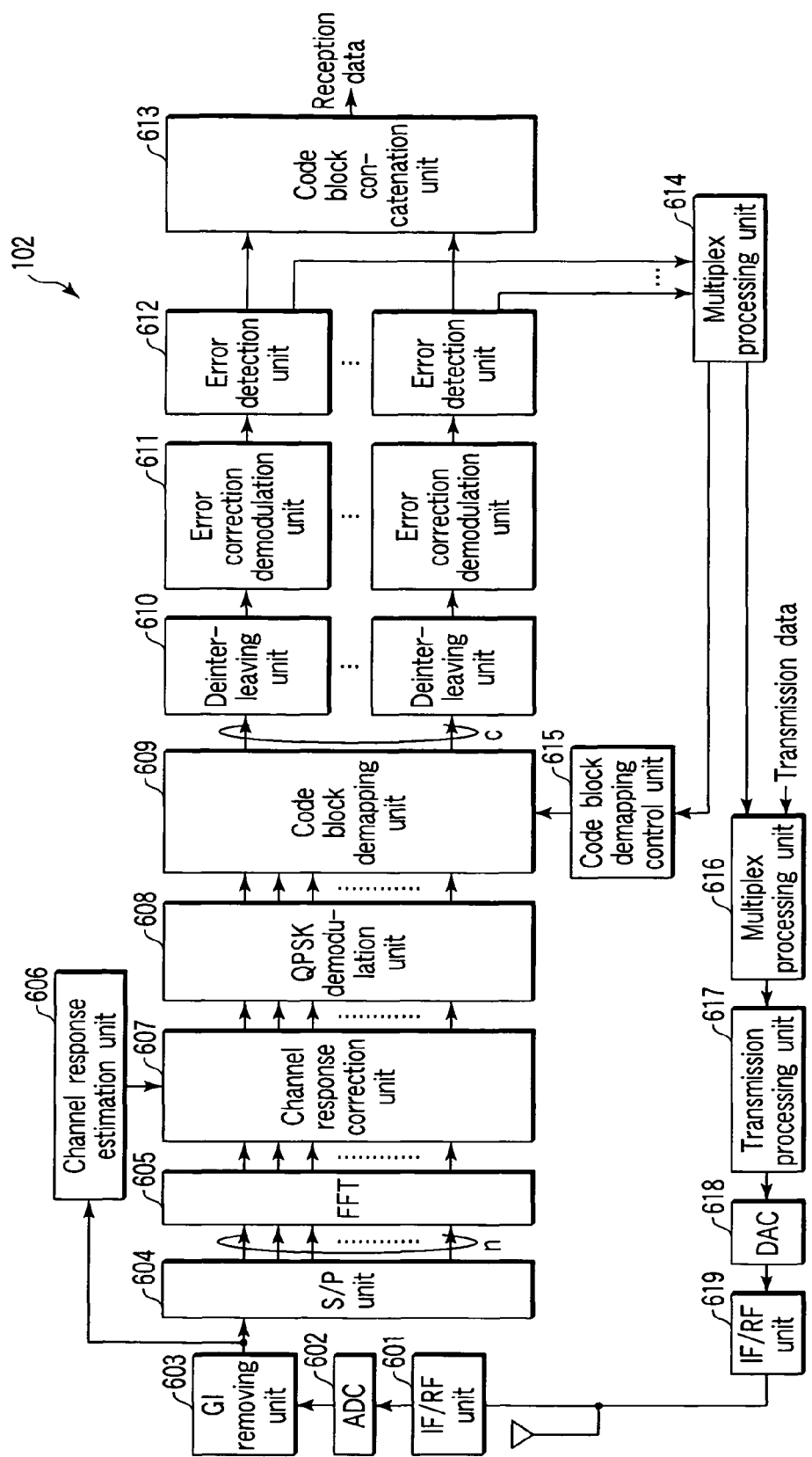
F I G. 6

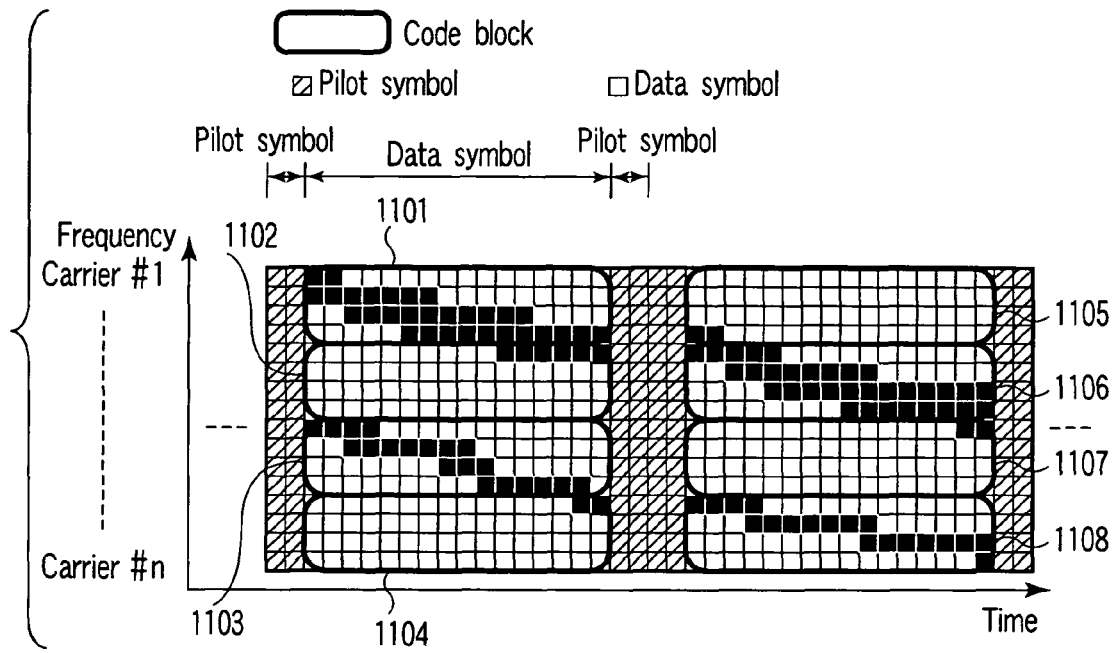
F I G. 11
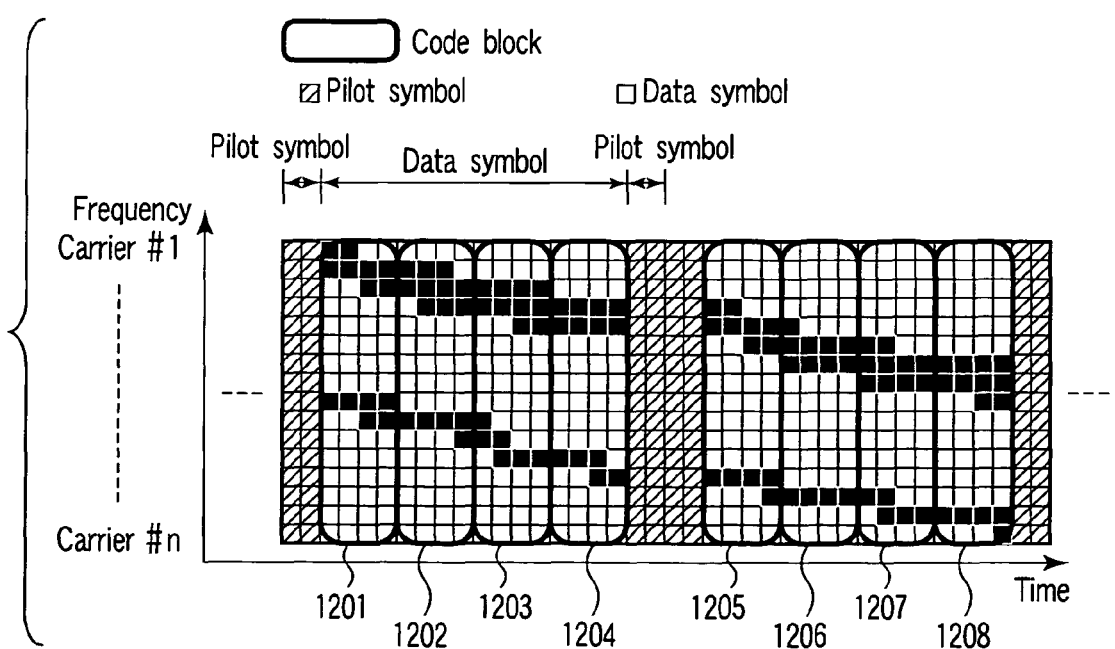
F I G. 12

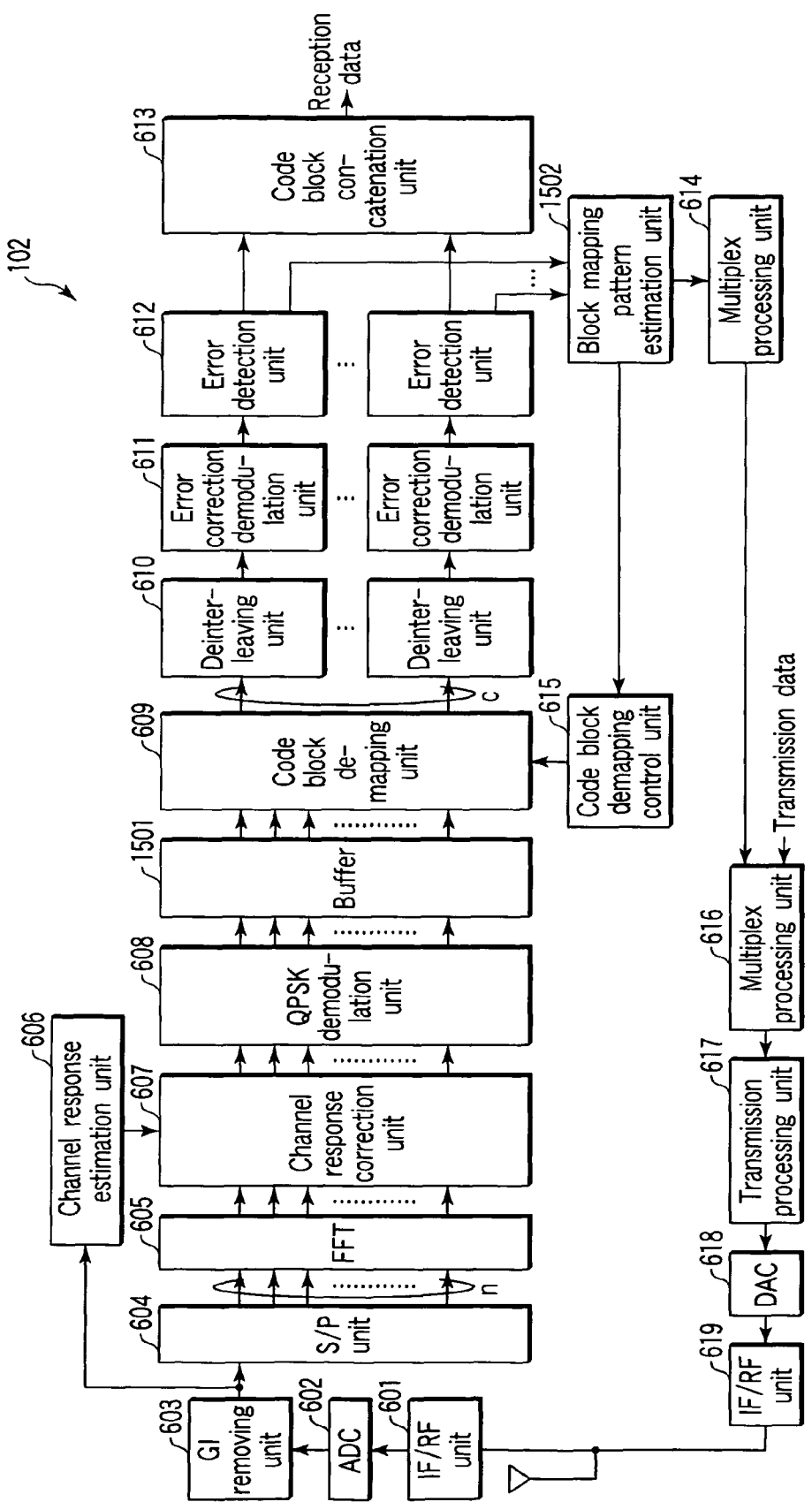
F I G. 15

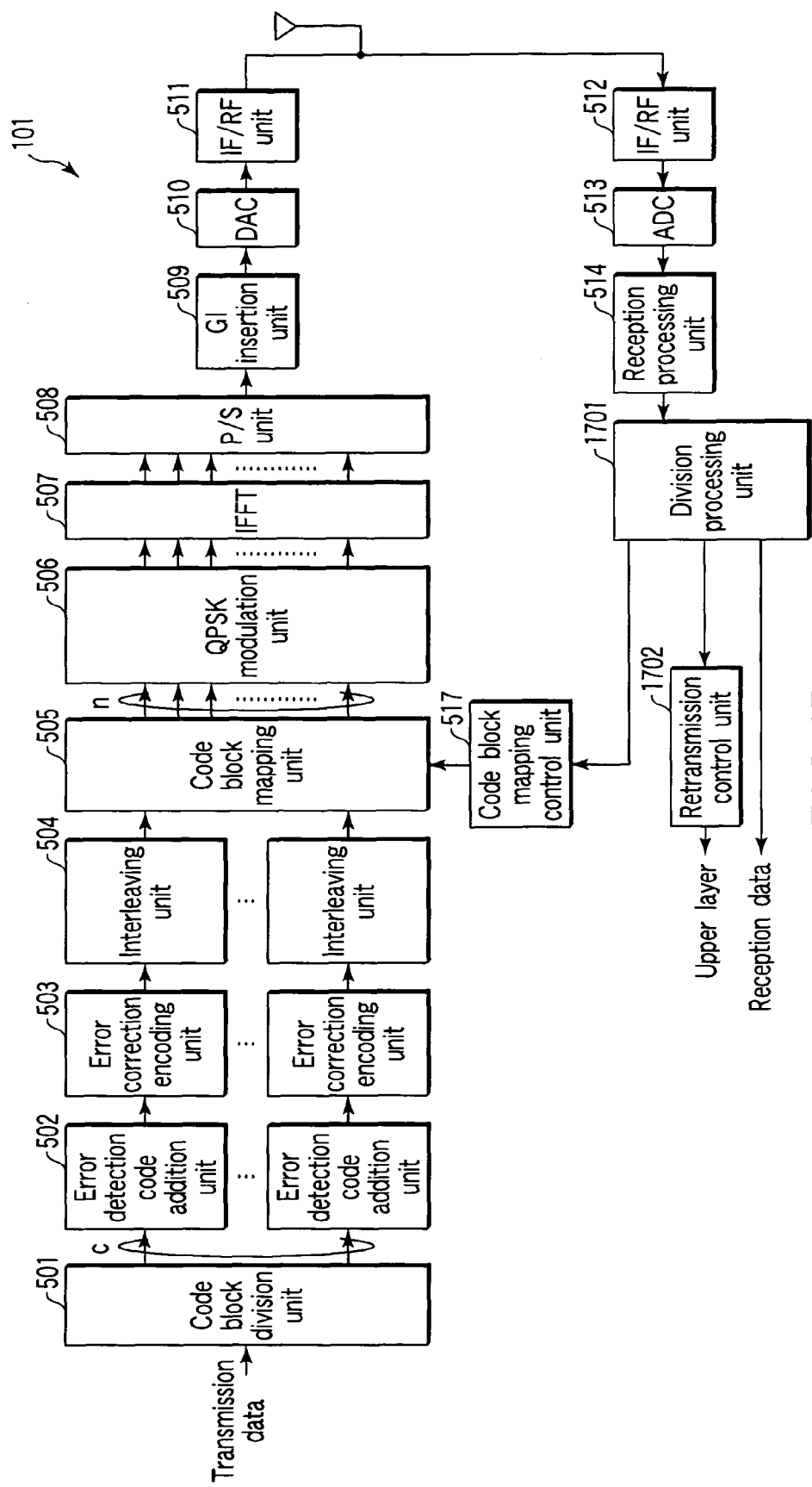
F I G. 17

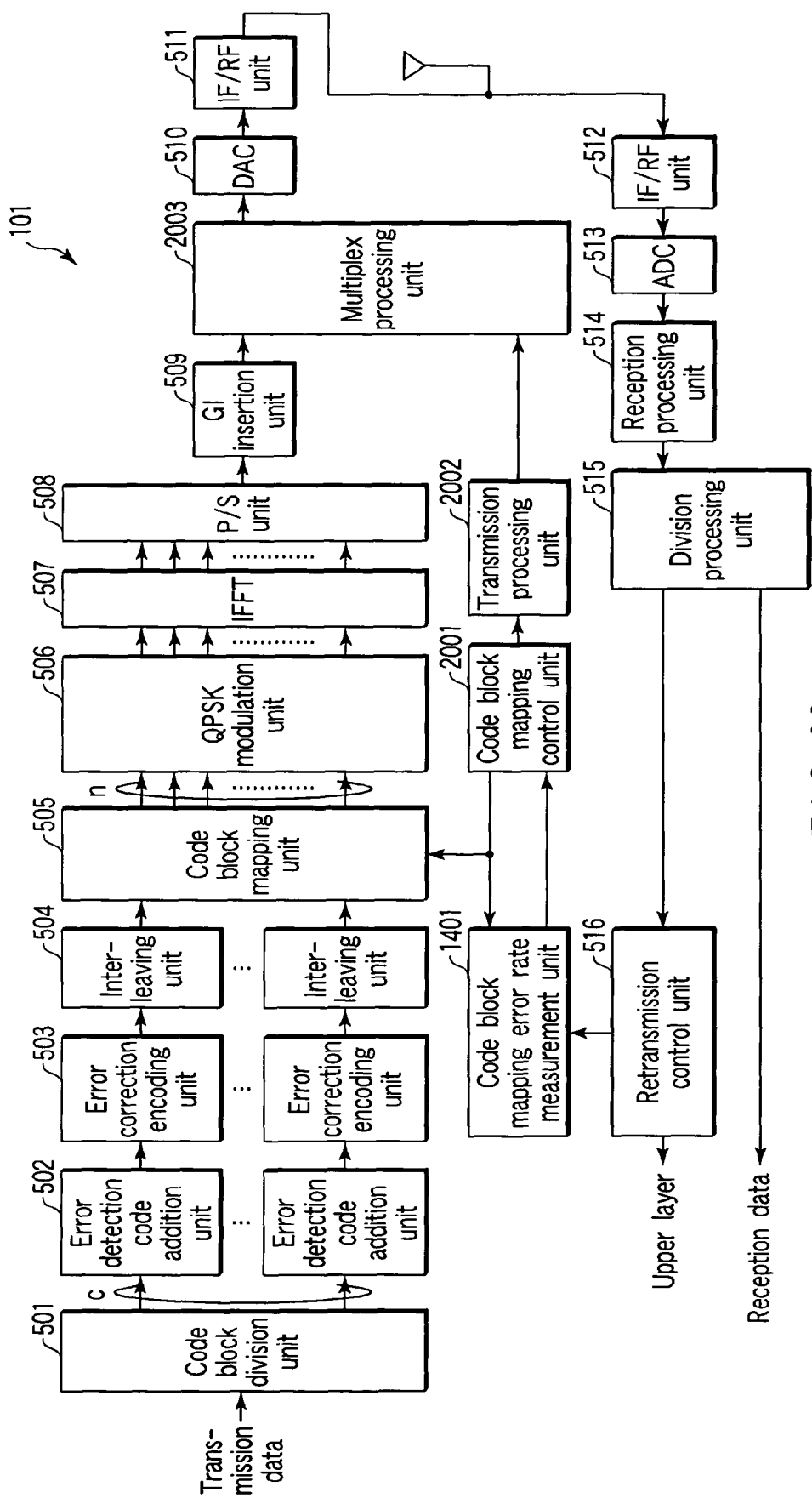
F I G. 20

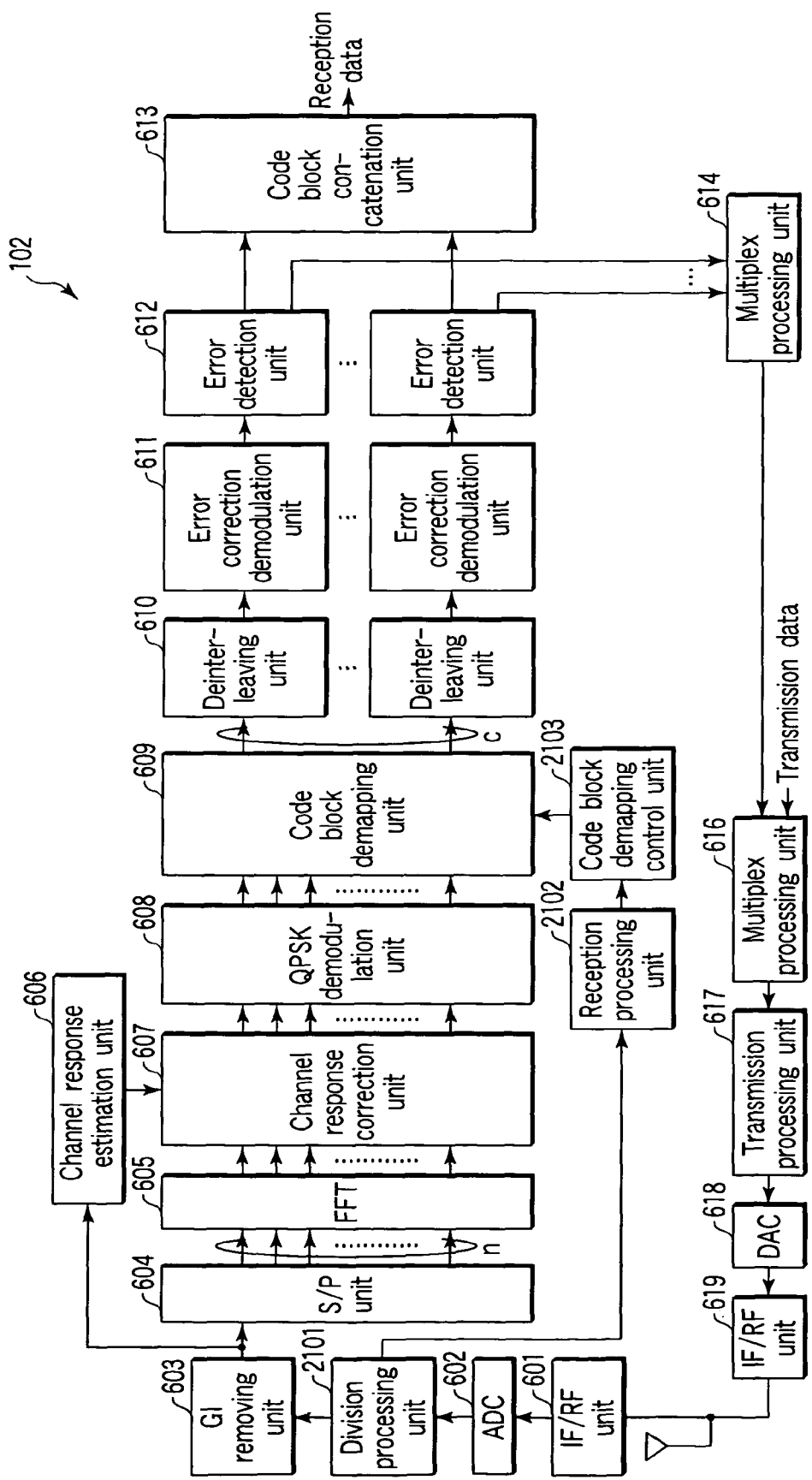
F I G. 21

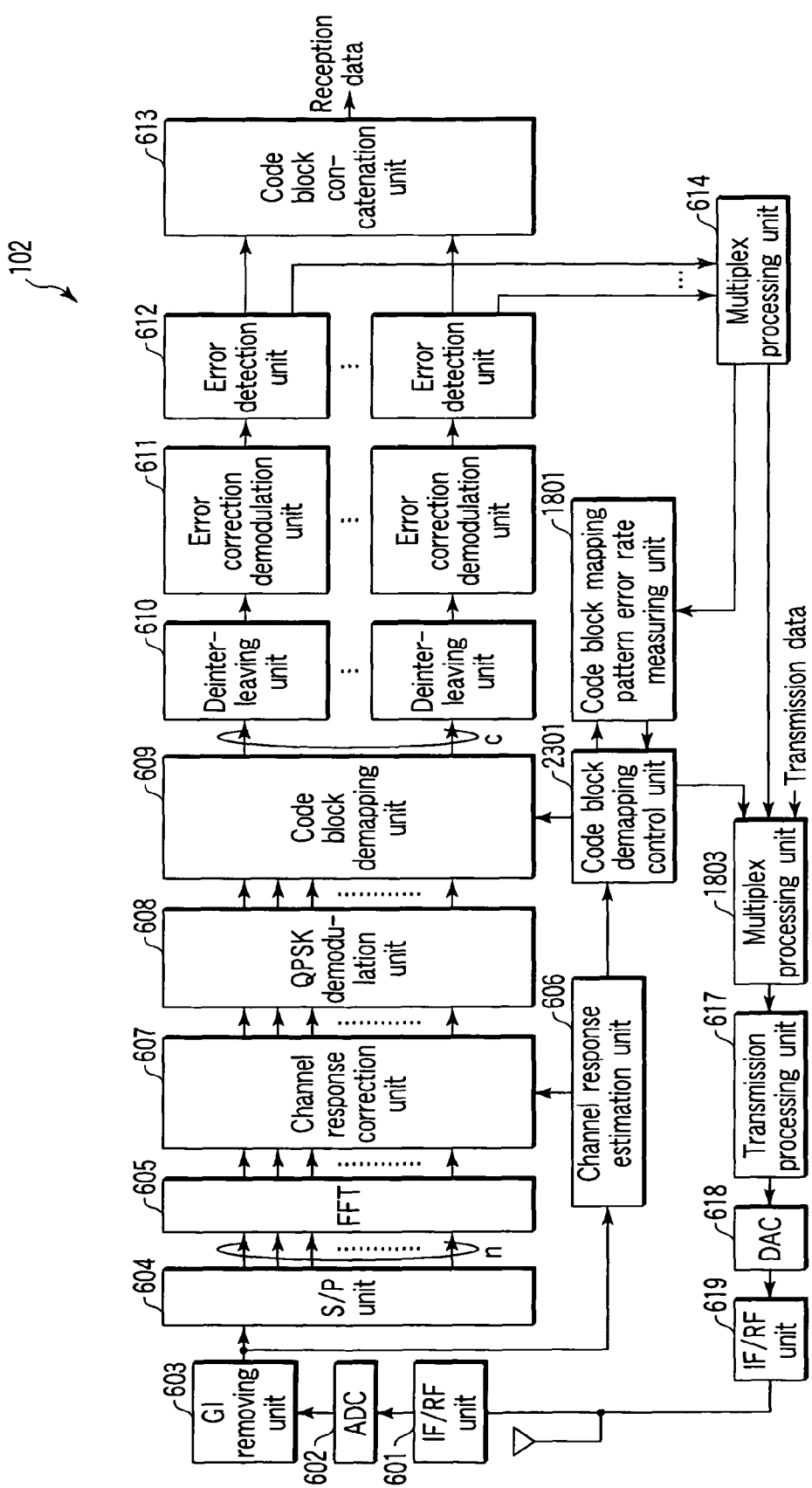
F I G. 23

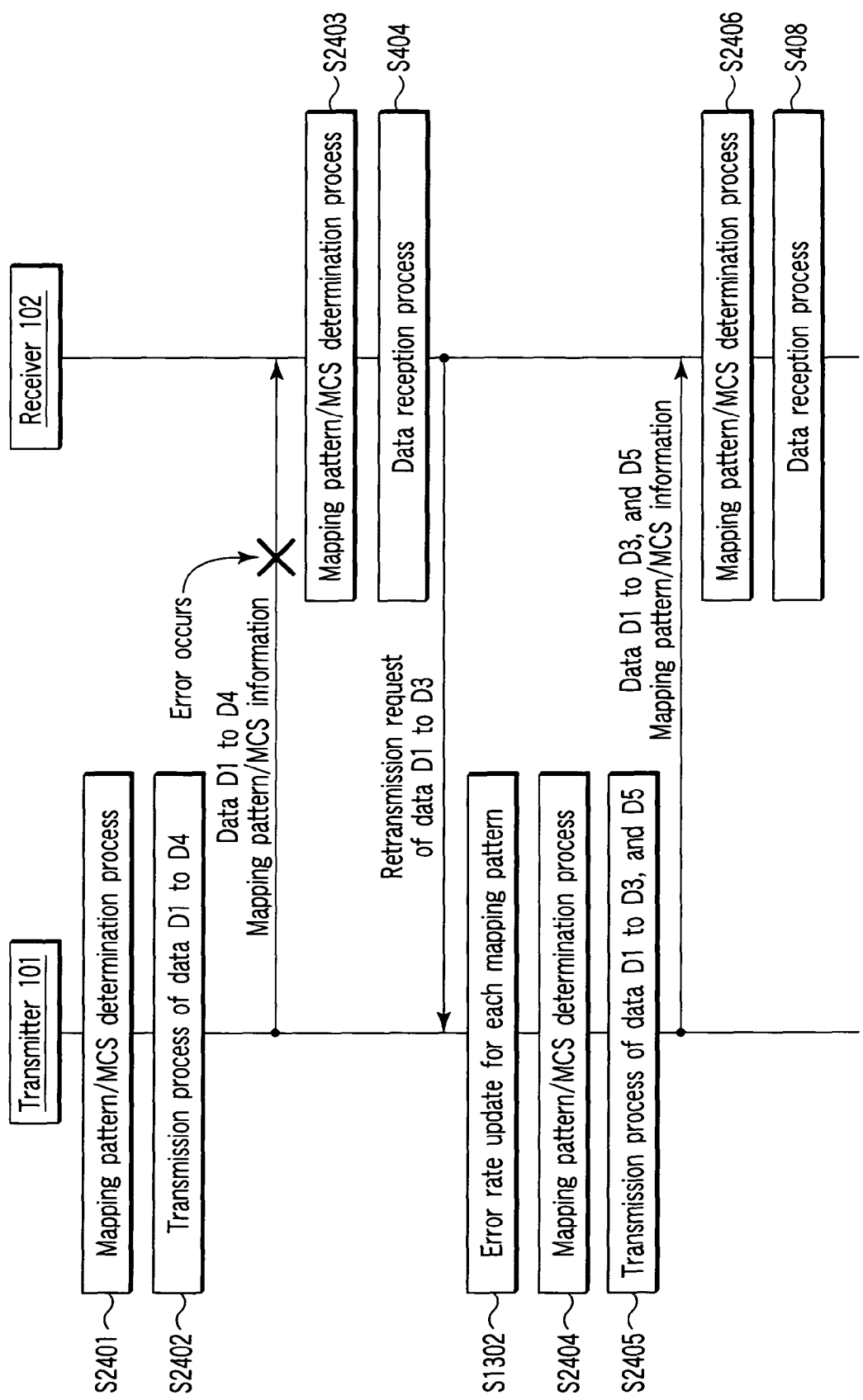
F I G. 24

RADIO COMMUNICATION SYSTEM, RADIO TRANSMISSION APPARATUS AND RADIO RECEPTION APPARATUS

CROSS-REFERENCE TO RELATED APPLICATIONS

This is a Continuation Application of PCT Application No. PCT/JP2006/300899, filed Jan. 16, 2006, which was published under PCT Article 21(2) in English.

This application is based upon and claims the benefit of priority from prior Japanese Patent Application No. 2005-010702, filed Jan. 18, 2005, the entire contents of which are incorporated herein by reference.

BACKGROUND OF THE INVENTION

1. Field of the Invention

The present invention relates to a multi-carrier radio communication system and, more particularly, to a radio communication system, radio transmission apparatus and radio reception apparatus for error correction in retransmission.

2. Description of the Related Art

In a conventional retransmission control scheme in multi-carrier communication, a mobile station and a base station generally perform the following processes (see, e.g., Jpn. Pat. Appln. KOKAI Publication No. 2004-104574). The mobile station measures a reception channel quality for each carrier or carrier group, and transmits information about the measured reception channel quality to the base station. When an error is found in received data from the base station, the mobile station issues a retransmission request to the base station. Upon reception of the retransmission request, the base station transmits retransmission data to the mobile station. In this case, the base station transmits this retransmission data using a carrier other than the carrier or carrier group determined to be unusable based on the reception channel quality. The mobile station then demodulates this retransmission data.

However, in the above-described prior art, a channel response estimation means is required to accurately determine channel responses. A large overhead is also required to feed back, to the transmission side, the information of the channel responses and carrier to be used. Additionally, it is a challenge to increase a system throughput in communication, and decrease a processing amount for retransmission control and channel response estimation.

BRIEF SUMMARY OF THE INVENTION

In accordance with a first aspect of the invention, there is provided a radio communication system comprising:

a radio transmitter comprising: a division unit configured to divide transmission data into a plurality of first code blocks each having N-bit data (N is an integer of not less than 1); an addition unit configured to add a plurality of error detection codes to the first code blocks, respectively; an assignment unit configured to assign the first code blocks to a plurality of second code blocks each including M (M is an integer of not less than 1 and not more than a carrier count) carriers each having L (L is an integer of not less than 1) symbols; and a transmission unit configured to transmit the second code blocks to which the first code blocks are assigned; and a radio receiver comprising: a reception unit configured to receive the second code blocks transmitted by the transmission unit; a conversion unit configured to convert the received second code blocks into the first code blocks to which the error detection codes are added, based on values of M and L; a correction decoding unit configured to subject the first coded blocks obtained by the conversion unit to error correction decoding; a detection unit configured to detect an error of at least one code block of the first code blocks subjected to the error correction decoding; a generation unit configured to generate a retransmission request signal for requesting a retransmission of the code block including the error, if the error is detected by the detection unit; and a transmission unit configured to transmit the retransmission request signal, and the radio transmitter further comprising: a reception unit configured to receive the retransmission request signal from the radio receiver; a count unit configured to count number of times of reception of the retransmission request signal; and a change unit configured to change values of M and L in accordance with the counted number.

In accordance with a second aspect of the invention, there is provided a radio communication system comprising:

a radio transmitter comprising: a division unit configured to divide transmission data into a plurality of first code blocks each having N-bit data (N is an integer of not less than 1); an addition unit configured to add a plurality of error detection codes to the first code blocks, respectively; an assignment unit configured to assign the first code blocks to a plurality of second code blocks each including M (M is an integer of not less than 1 and not more than a carrier count) carriers each having L (L is an integer of not less than 1) symbols; and a transmission unit configured to transmit the second code blocks to which the first code blocks are assigned; and a radio receiver comprising: a reception unit configured to receive the second code blocks transmitted by the transmission unit; a conversion unit configured to convert the received second code blocks into the first code blocks to which the error detection codes are added, based on first values of M and L; a correction decoding unit configured to subject the first coded blocks obtained by the conversion unit to error correction decoding; a detection unit configured to detect an errors of at least one code block of the first code blocks subjected to the error correction decoding; a generation unit configured to generate a retransmission request signal for requesting a retransmission of the code block including the error, if the error is detected by the detection unit; and a transmission unit configured to transmit the retransmission request signal; and the radio transmitter further comprising: a reception unit configured to receive the retransmission request signal from the radio receiver; a calculation unit configured to calculate an error rate indicating an error detection degree in the code block in correspondence with the first values of M and L based on the retransmission request signal; an error rate storage unit configured to store the error rate in correspondence with the first values of M and L; and a change unit configured to change the first values of M and L to second values of M and L corresponding to the code block with an error rate lower than the error rate corresponding to the first values of M and L, with reference to the stored error rate.

In accordance with a third aspect of the invention, there is provided a radio transmission apparatus comprising: a transmission unit configured to multiplex carriers in a frequency direction and transmits data to a partner apparatus; and a change unit configured to change, for each retransmission of the data, a combination of a carrier count and a symbol count for determining a code block which is a minimum unit for error detection of the data, based on a channel response between the radio transmission apparatus and the partner apparatus.

In accordance with a fourth aspect of the invention, there is provided a radio reception apparatus comprising: a reception unit configured to receive a plurality of first code blocks each including M (M is an integer of not less than 1 and not more than a carrier count) carriers each having L (L is an integer of not less than 1) symbols; a conversion unit configured to convert the received first code blocks into a plurality of second code blocks each having N bit data (N is an integer of not less than 1) to which the error detection codes are added, based on values of M and L; a correction decoding unit configured to subject the second coded blocks obtained by the conversion unit to error correction decoding; a detection unit configured to detect an error of at least one code block of the first code blocks subjected to the error correction decoding; and a generation unit configured to generate a retransmission request signal for requesting a retransmission of the code block including the error, if the error is detected by the detection unit.

BRIEF DESCRIPTION OF THE SEVERAL VIEWS OF THE DRAWING

FIG. 6 is a block diagram showing the receiver according to the first embodiment of the present invention;

FIG. 11 is a graph showing a state wherein a multi-path has a small temporal variation, and errors in a specific carrier occur over some symbols in the code block mapping pattern shown in FIG. 7;

FIG. 12 is a graph showing a state wherein a multi-path has a small temporal variation, and errors in the specific carrier occur over some symbols in the code block mapping pattern shown in FIG. 8;

FIG. 15 is a block diagram showing the receiver according to the second embodiment of the present invention;

FIG. 17 is a block diagram showing the transmitter according to the third embodiment of the present invention;

FIG. 20 is a block diagram showing the transmitter according to the fourth embodiment of the present invention;

FIG. 21 is a block diagram showing the receiver according to the fourth embodiment of the present invention;

FIG. 23 is a block diagram showing a receiver configuration according to the fifth embodiment of the present invention;

FIG. 24 is a flowchart showing an example of processes in a transmitter and a receiver according to the sixth embodiment of the present invention;

DETAILED DESCRIPTION OF THE INVENTION

A radio communication system, a radio transmission apparatus and radio reception apparatus will be described in detail below with reference to accompanying drawing according to an embodiment of the present invention.

Figure 1:
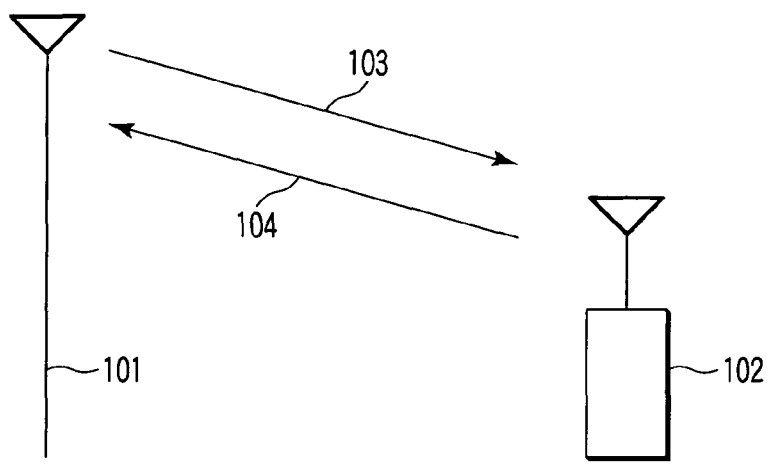
FIG. 1 is a view showing transmission and reception of a signal between radio communication systems according to an embodiment of the present invention.

As shown in FIG. 1, the radio communication system in the embodiment includes a transmitter 101 and a receiver 102. The transmitter 101 and the receiver 102 perform radio communication with each other using a multi-carrier signal multiplexed on the frequency axis. The transmitter 101 transmits a transmission signal 103 to the receiver 102. When the receiver 102 cannot correctly receive the transmission signal 103, the receiver 102 issues a retransmission request signal 104 to the transmitter 101. Upon reception of the retransmission request signal 104, the transmitter 101 retransmits, to the receiver 102, the data requested to be retransmitted.

Figure 2:
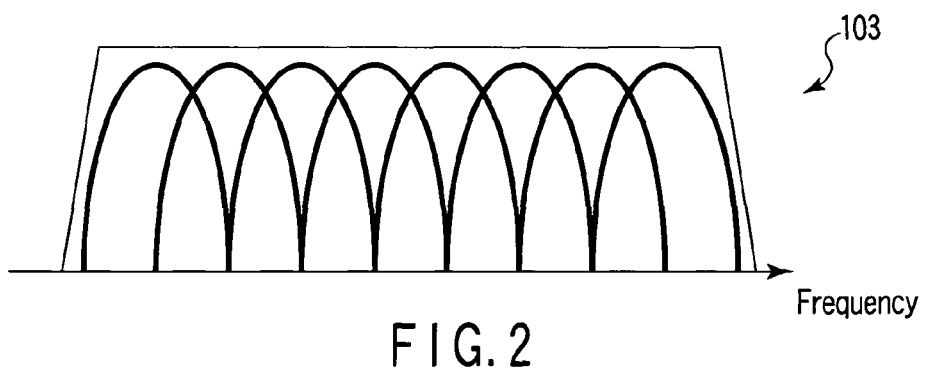
FIG. 2 is a graph showing an example of the frequency characteristics of a transmission signal used in the radio communication system according to the embodiment of the present invention.
Figure 3:
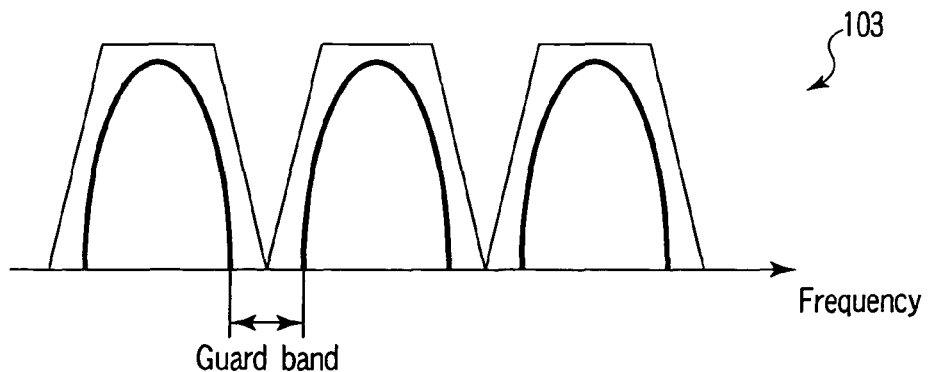
FIG. 3 is a graph showing another example of the frequency characteristics of the transmission signal used in the radio communication system according to the embodiment of the present invention.

The frequency characteristics of the transmission signal 103 used in the multi-carrier radio communication system of the embodiment will be described in detail below with reference to FIGS. 2 and 3.

The transmission signal 103 is the multi-carrier signal multiplexed on the frequency axis. A carrier multiplexing scheme of the transmission signal 103 is not particularly limited. For example, the carrier of the transmission signal 103 may be multiplexed using an orthogonal frequency as shown in FIG. 2, or a guard band as shown in FIG. 3.

The embodiment of the present invention has been made to solve the above problems, and has as its object to provide a radio communication system, radio transmission apparatus and radio reception apparatus for decreasing a retransmission count and increasing a throughput.

In the radio communication system, radio transmission apparatus and radio reception apparatus according to the embodiment of the present invention, the retransmission count can decrease, and the system throughput can increase.

First Embodiment

Figure 4:
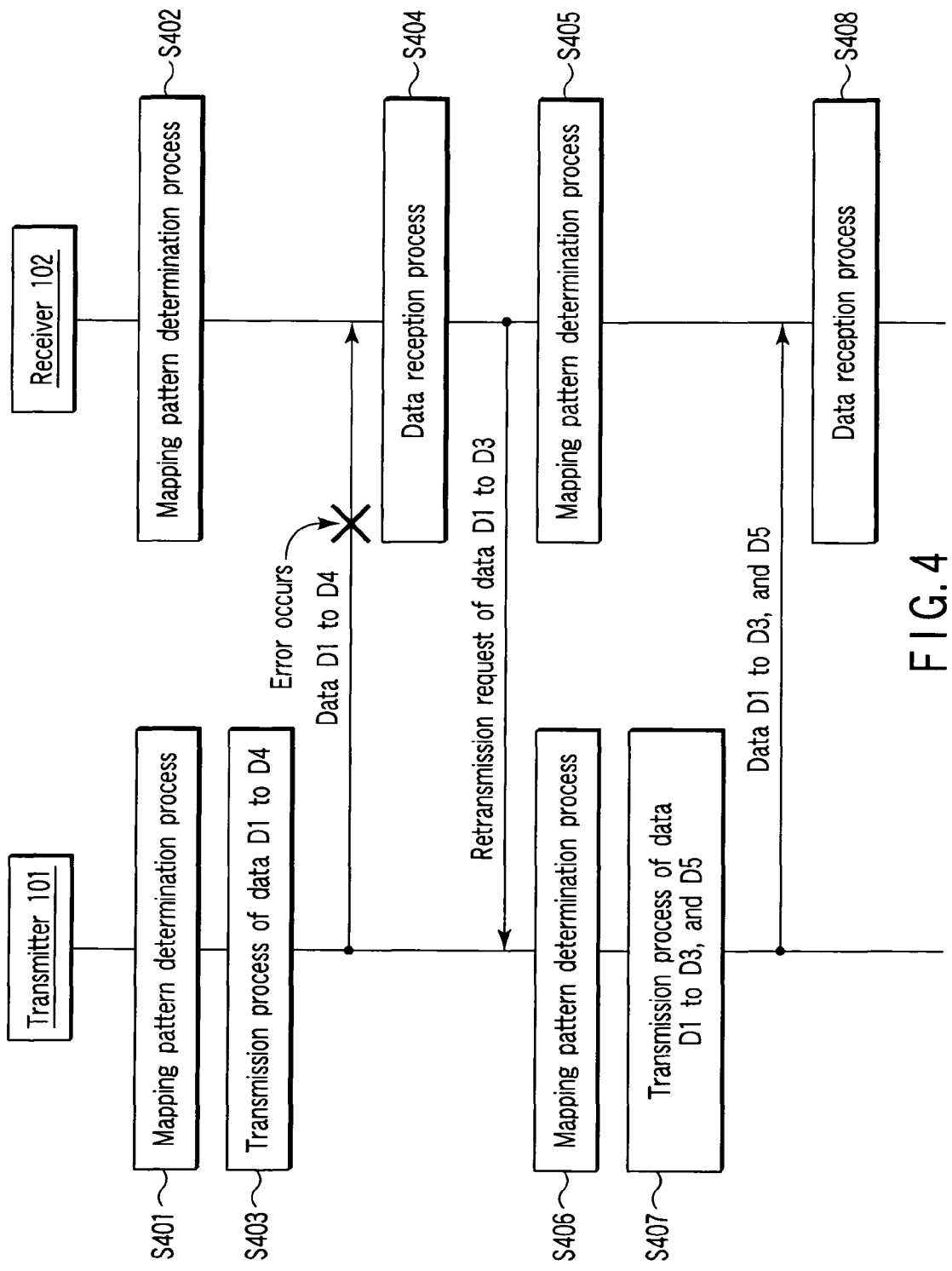
FIG. 4 is a flowchart showing an example of processes in a transmitter and a receiver according to the first embodiment of the present invention.

The processes in a transmitter 101 and a receiver 102 according to the first embodiment will be exemplified below with reference to FIG. 4. In the first embodiment, a code block mapping pattern used in the transmitter 101 and the receiver 102 is set in advance, or determined by using the same algorithm and data in the transmitter 101 and the receiver 102. Note that the code block mapping pattern is a combination of a carrier count M and a symbol count L (M and L are natural numbers) to which a code block is assigned. The code block is a minimum unit for performing error detection.

First, before data transmission, each of the transmitter 101 and the receiver 102 performs a code block mapping pattern determination process (steps S401 and S402) for transmitting and receiving data. In this code block mapping pattern determination process, a given code block mapping pattern is selected from a plurality of code block mapping pattern candidates. These code block mapping pattern candidates are determined from the code block mapping patterns transmitted and received between the transmitter 101 and the receiver 102 at the timing when synchronization between the transmitter 101 and the receiver 102 is established. In this case, assume that the code block mapping pattern is notified from an upper layer. Alternatively, the code block mapping pattern may be uniquely determined based on information notified from the transmitter 101, or the unique index of the receiver 102.

The transmitter 101 then performs a transmission process for transmission data by using the code block mapping pattern selected in step S401 (step S403). This transmission process includes processes such as code block division, error detection code addition, error correction encoding, interleaving, code block mapping, modulation, and the like. In this example, the data is divided into code blocks D1 to D4, and then transmitted.

Assume that during data transmission from the transmitter 101 to the receiver 102, errors occur due to any reason in the code blocks D1, D2, and D3. The receiver 102 performs a data reception process (step S404). If the error cannot be corrected even when the receiver 102 performs the reception process for the data in which the error has occurred, the receiver 102 issues, to the transmitter 101, a retransmission request of the code blocks D1, D2, and D3 in which the errors have not been corrected. In this case, the reception process includes processes such a channel response estimation, channel response correction, demodulation, code block demapping, deinterleaving, error correction decoding, error detection, and the like.

In accordance with the transmission count of the retransmission request, the receiver 102 changes the code block mapping pattern in the code block mapping pattern determination process (step S405). In accordance with the reception count of the retransmission request, the transmitter 101 changes the code block mapping pattern in the code block mapping pattern determination process (step S406). As described above, after changing the code block mapping pattern, the transmitter 101 performs the transmission process for the retransmission data D1, D2, and D3, and, e.g., new data D5, and then transmits these data to the receiver 102 (step S407). In accordance with the code block mapping pattern determined in step S405, the receiver 102 performs the reception process for the transmitted data (step S408).

Figure 5:
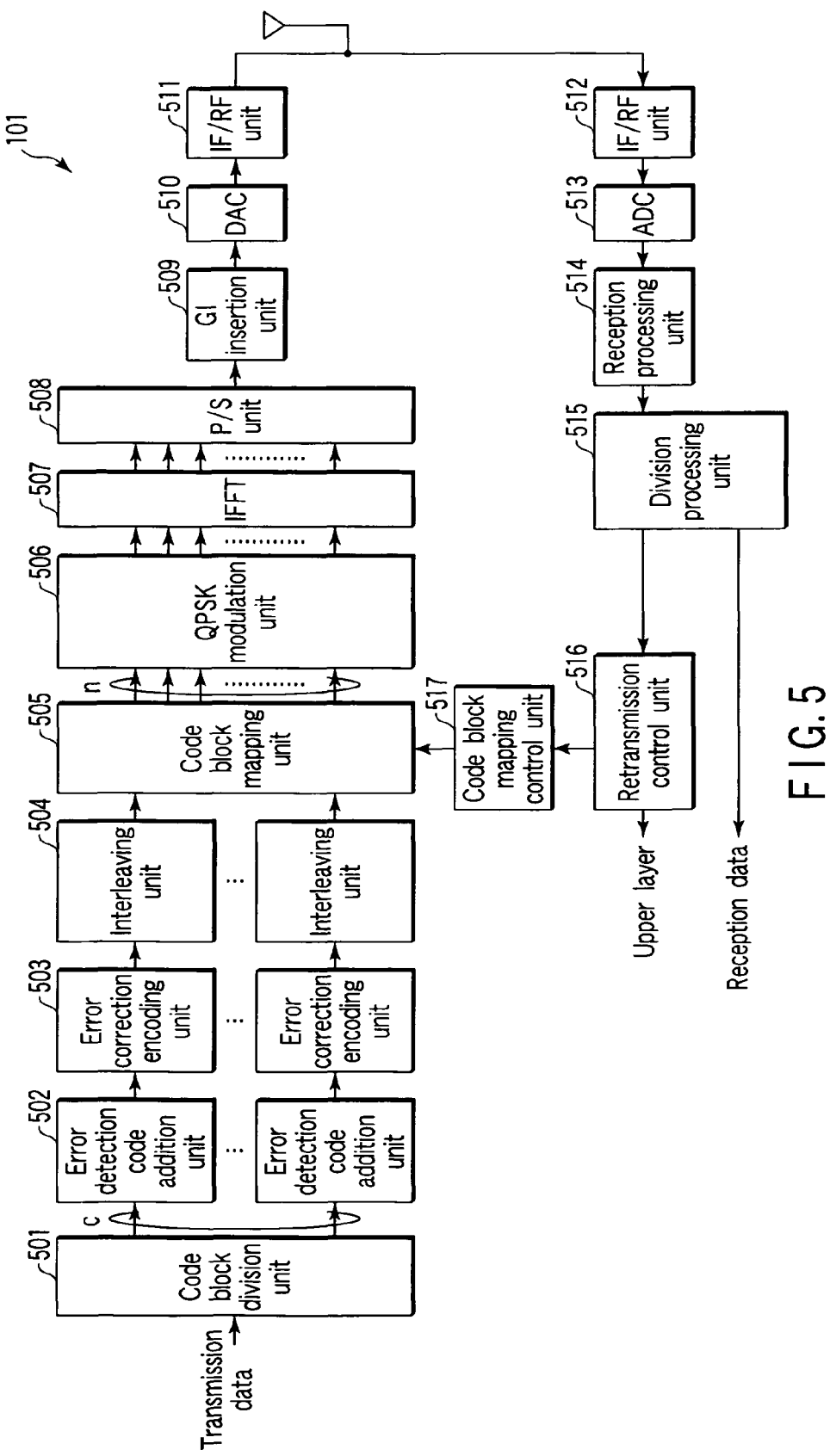
FIG. 5 is a block diagram showing the transmitter according to the first embodiment of the present invention.

The transmitter 101 according to the first embodiment will be described below with reference to FIG. 5.

The transmitter 101 includes a code block division unit 501, error detection code addition unit 502, error correction encoding unit 503, interleaving unit 504, code block mapping unit 505, QPSK (quadrature phase-shift keying) modulation unit 506, IFFT (inverse fast Fourier transformer) 507, P/S (parallel-to-serial conversion) unit 508, GI (guard interval) insertion unit 509, DAC (digital-to-analog converter) 510, IF/RF (intermediate-frequency/radio frequency) units 511 and 512, ADC (analog-to-digital converter) 513, reception processing unit 514, division processing unit 515, retransmission control unit 516, and code block mapping control unit 517.

The code block division unit 501 divides the data transmitted from the transmitter 101 into C code blocks each having N-bit data.

The error detection code addition unit 502 adds an error detection parity bit to the N-bit data divided in the code blocks. For example, the error detection parity bit which is added by the error detection code addition unit 502 is a CRC (cyclic redundancy check code) parity bit.

The error correction encoding unit 503 performs an error correction encoding process for the data to which the parity bit is added by the error detection code addition unit 502. For example, the error correction encoding unit 503 performs the error correction encoding process such as a convolution encoding, turbo encoding, and LDPC (low-density parity check) encoding. The interleaving unit 504 performs an interleaving process for the data which has undergone the error correction encoding process by the error correction encoding unit 503.

The code block mapping unit 505 assigns data having L symbols to each of M carriers. In this case, N_enc=M×L holds when a bit count after encoding the code block is set to N_enc. Also, n=M×C holds when the total carrier count is set to n. Hence, the code block mapping unit 505 assigns C code block data to each of the n carriers. The carrier count M and the symbol count L are determined by the code block mapping control unit 517 described later.

The QPSK modulation unit 506 maps the data assigned to the n carriers into a plane with an I signal and a Q signal. In the first embodiment, QPSK is exemplified as a modulation scheme. However, another modulation scheme such as QAM (quadrature amplitude modulation) and π/4 shift QPSK can also be used.

The IFFT 507 inversely Fourier-transforms the QPSK-modulated signal, and converts the transformed signal into a signal on an orthogonal frequency. In this embodiment, OFDM (orthogonal frequency division multiplexing) for assigning the carrier to the orthogonal frequency as in FIG. 2 is used. However, FDM (frequency division multiplexing) for inserting the guard band is also possible as in FIG. 3. After that, by parallel-to-serial conversion, the P/S unit 508 converts, into a serial signal, a parallel signal inversely Fourier-transformed by the IFFT 507.

The GI insertion unit 509 inserts the GI to the serial signal output from the P/S unit 508. The DAC 510 performs digital-to-analog conversion (to be referred to as DAC hereinafter) to convert the signal to which the GI is inserted, into the analog signal. The IF/RF unit 511 performs intermediate frequency conversion and radio frequency conversion to convert the signal output from the DAC 510 into the radio frequency signal. The converted signal is transmitted from an antenna to the receiver 102.

The IF/RF unit 512 converts the signal which has been transmitted from the receiver 102 and received by the antenna into a baseband frequency signal. The ADC 513 performs analog-to-digital conversion (to be referred to ADC hereinafter) to digitize the received signal which is converted into the baseband frequency signal. The reception processing unit 514 demodulates the received signal converted into the digital signal, performs error correction decoding, and the like. The reception processing unit 514 corresponds to a transmission processing unit 617 (described later) in the receiver 102. The reception processing unit 514 and the transmission processing unit 617 can employ any communication scheme as far as the reception processing unit 514 and the transmission processing unit 617 have the same scheme.

The division processing unit 515 divides the received signal obtained from the reception processing unit 514 into the reception data and a retransmission request signal if present. The retransmission control unit 516 uses the retransmission request signal to determine a specific packet to be retransmitted.

The retransmission control unit 516 instructs the upper layer to perform a retransmission procedure for the packet requested to be retransmitted. The retransmission control unit 516 also issues a request to change the code block mapping pattern in retransmission.

Upon reception of a request to change the code block mapping pattern, the code block mapping control unit 517 changes the code block mapping pattern. For example, the code block mapping control unit 517 counts the number of times of reception of the retransmission request signal from the receiver 102. When the retransmission request signal is received a predetermined number of times, the code block mapping control unit 517 changes the code block mapping pattern. The type of code block mapping pattern to be changed will be described in more detail below with reference to FIGS. 7 and 8.

The receiver 102 according to the first embodiment will be described with reference to FIG. 6.

The receiver 102 includes an IF/RF unit 601, ADC 602, GI removing unit 603, S/P unit 604, FFT 605, channel response estimation unit 606, channel response correction unit 607, QPSK demodulation unit 608, code block demapping unit 609, deinterleaving unit 610, error correction decoding unit 611, error detection unit 612, code block concatenation unit 613, retransmission request processing unit 614, code block demapping control unit 615, multiplex processing unit 616, transmission processing unit 617, DAC 618, and IF/RF unit 619.

The IF/RF unit 601 converts the received signal which has been transmitted from the transmitter 101 and received by the antenna, into the baseband frequency signal. The ADC 602 digitizes the baseband frequency signal. The GI removing unit 603 removes the GI from the received signal which has been digitized. The S/P unit 604 converts the signal from which the GI is removed, into n parallel signals. The FFT 605 converts these parallel signals into time axis signals.

The channel response estimation unit 606 estimates a channel response by using a known signal such as a pilot signal included in the received signal. The channel response correction unit 607 corrects distortion of the channel response by using the channel response estimated by the channel response correction unit 607.

The QPSK demodulation unit 608 QPSK-demodulates the signal whose channel response is corrected. This demodulation process corresponds to a modulation process performed by the QPSK modulation unit 506 in the transmitter 101. Hence, when the transmitter 101 employs another modulation scheme in the modulation process, the receiver 102 also employs a demodulation scheme corresponding to the modulation scheme of the transmitter 101 in the demodulation process.

The code block demapping unit 609 converts the n parallel signals output from the QPSK demodulation unit 608 into the C code blocks each having M carriers and L symbols. In this case, the carrier count M and the symbol count L are designated by the code block demapping control unit 615.

Each of the deinterleaving unit 610 inputs the code block output from the code block demapping unit 609, and performs the deinterleaving process. Each of the error correction decoding units 611 performs the error correction decoding process for the deinterleaved signal. The error correction decoding unit 611 also performs an error correction decoding process, e.g., Viterbi decoding, turbo decoding, and LDPC decoding corresponding to the error correction encoding unit 503 of the transmitter 101.

Each of the error detection units 612 inputs an output signal from the error correction decoding unit 611, and detects whether an error occurs in the received signal having undergone the error correction decoding process. The error detection unit 612 detects the error by using the parity bit added by the error detection code addition unit 502 in the transmitter 101. When no error is detected in the received signal, the error detection unit 612 outputs the signal to the code block concatenation unit 613. The code block concatenation unit 613 concatenates the code blocks to each other, and outputs the concatenated code blocks as the reception data.

Alternatively, when the errors are detected in one or more code blocks, the error detection unit 612 specifies the code block in which the error is detected, and then outputs the signal indicating the specified code block to the retransmission request processing unit 614. The retransmission request processing unit 614 outputs the retransmission request signal to request the retransmission process.

Upon reception of the retransmission request information from the retransmission request processing unit 614, the code block demapping control unit 615 changes the code block mapping pattern based on this information. The change algorithm of the code block demapping control unit 615 is the same as that of the code block mapping control unit 517 of the transmitter 101.

The retransmission request signal generated by the retransmission request processing unit 614 may include information serving as the code block mapping pattern which is determined between the transmitter 101 and the receiver 102 in advance. The code block mapping pattern may be determined on the system in advance. Alternatively, some code block mapping patterns may be stored in the retransmission request processing unit 614, and the transmitter 101 and the receiver 102 may be controlled in advance to have the same code block mapping pattern.

The multiplex processing unit 616 multiplexes the retransmission request information with the transmission data. For example, the multiplex processing unit 616 multiplexes the plurality of data using time multiplexing, frequency multiplexing, or code multiplexing. The transmission processing unit 617 modulates the transmission signal output from the multiplex processing unit 616, and performs the error correction encoding and the like. The transmission processing unit 617 corresponds to the reception processing unit 514 in the transmitter 101. The DAC 618 converts the output signal from the transmission processing unit 617 into an analog signal. The IF/RF unit 619 performs intermediate frequency conversion and radio frequency conversion to convert this analog signal into the radio frequency signal. The converted signal is transmitted from the antenna to the transmitter 101.

An example of the code block mapping pattern will be described below with reference to FIGS. 7 and 8.

Figure 7:
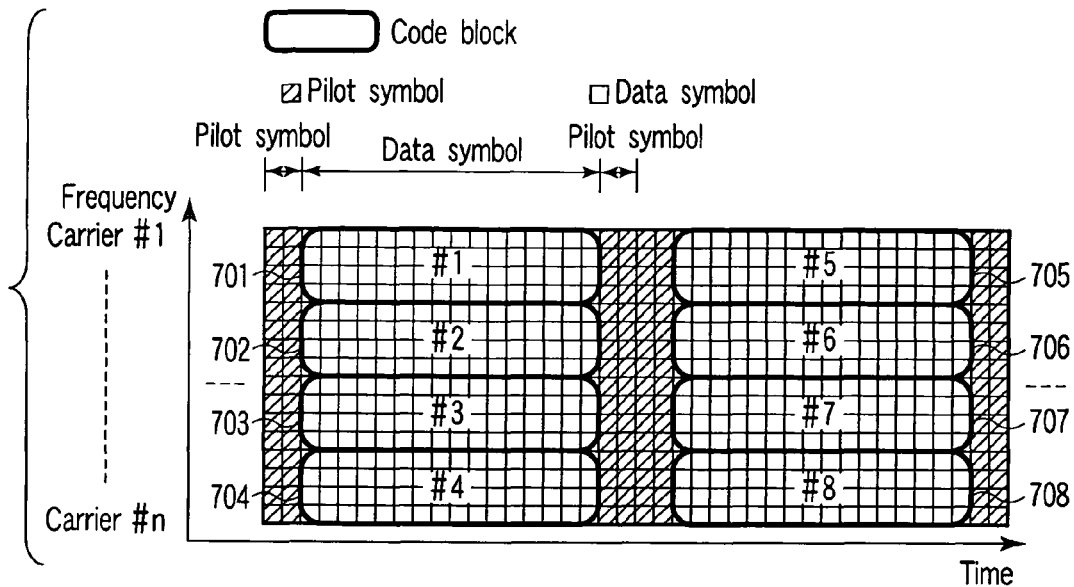
FIG. 7 is a graph showing an example of a code block mapping pattern according to the embodiment of the present invention.
Figure 8:
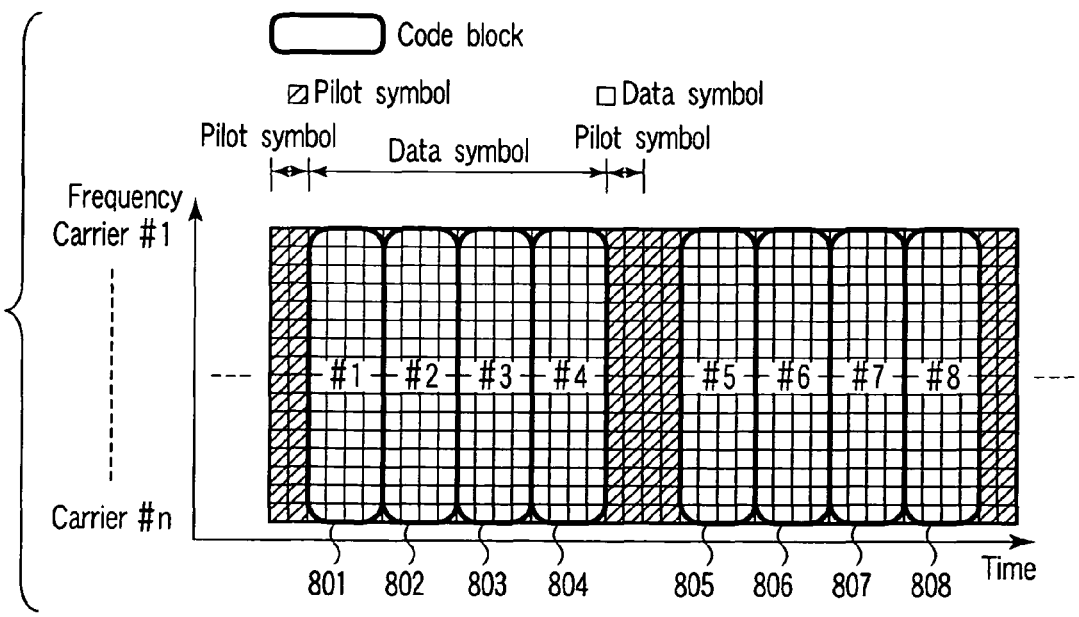
FIG. 8 is a graph showing another example of the code block mapping pattern according to the embodiment of the present invention.

FIGS. 7 and 8 show an example of the code block mapping pattern. In this example, the carrier count n is 16. Two sets of pilot symbols each including two symbols in front and rear positions, and a data symbol including 16 symbols are time-multiplexed to form one data slot. In the example shown in FIGS. 7 and 8, four code blocks #1 to #4 are provided. One data slot includes these code blocks and the pilot symbols in the front and rear of each of these code blocks. For example, two data slots are shown in FIGS. 7 and 8. The data symbol and pilot symbol are multiplexed in a frequency multiplexing scheme, a code multiplexing scheme, or the like.

FIG. 7 shows the example of the code block mapping pattern for assigning the four carriers to one code block. FIG. 8 shows the example of the code block mapping pattern for assigning the 16 carriers to one code block. For example, when the transmitter 101 receives the retransmission request signal K (K is an integer equal to or larger than 1) times during transmission using the code block mapping pattern as shown in FIG. 7, the code block mapping control unit 517 changes the code block mapping pattern to that shown in FIG. 8. Alternatively, when the transmitter 101 receives the retransmission request signal K times during transmission using the code block mapping pattern as shown in FIG. 8, the code block mapping control unit 517 changes the code block mapping pattern to that shown in FIG. 7.

Figure 9:
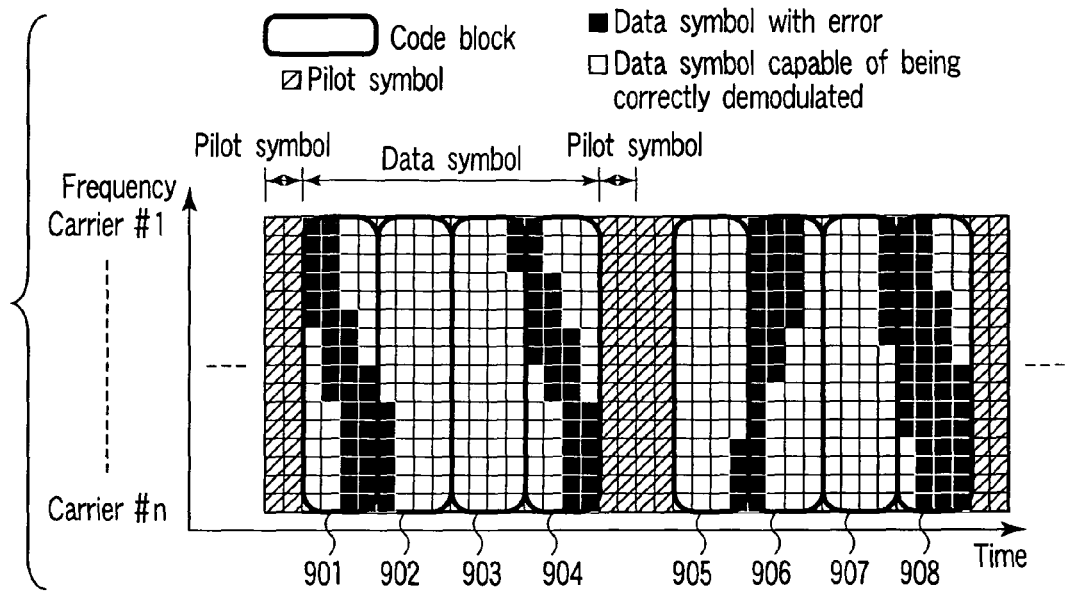
FIG. 9 is a graph showing a state wherein a multi-path has a low temporal spread, and errors in carriers tend to simultaneously occur in the code block mapping pattern shown in FIG. 8.
Figure 10:
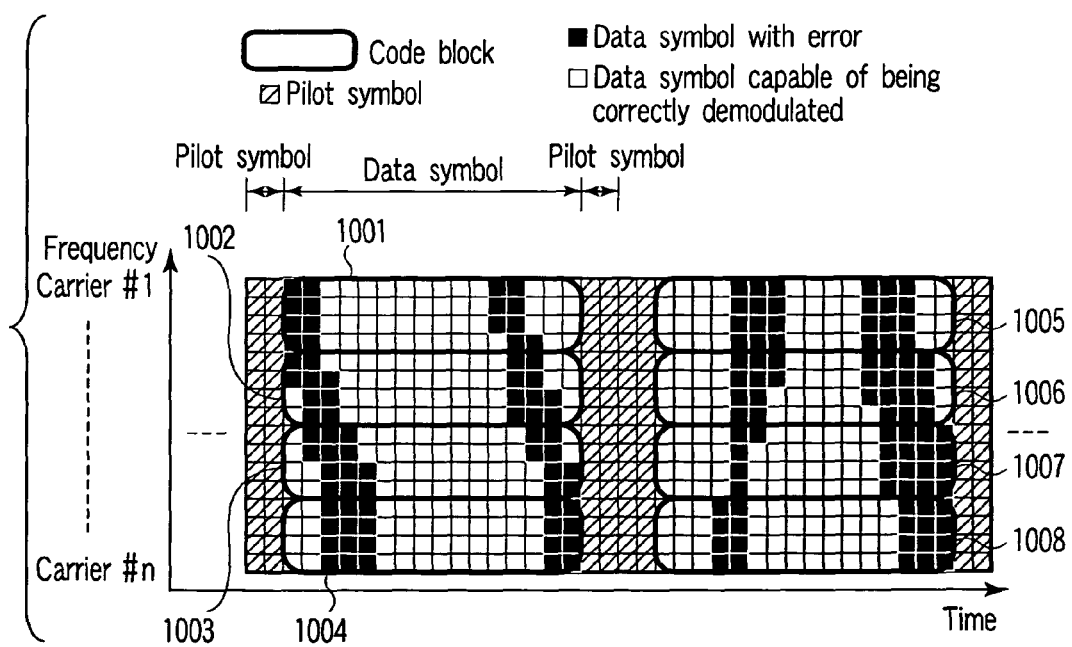
FIG. 10 is a graph showing a state wherein the multi-path has the low temporal spread, and the errors in carriers tend to simultaneously occur in the code block mapping pattern shown in FIG. 7.

A state wherein a data error occurs in the carrier in accordance with the channel response will be described below with reference to FIGS. 9, 10, 11, and 12. FIGS. 9 and 10 show a state wherein a multi-path has a low temporal spread, and errors in carriers tend to occur at the same time.

In this channel response, as in FIG. 9, when the code block mapping unit 505 maps to assign the code block to the 16 carriers, the errors occur in most data such as the code blocks 901, 904, 906, and 908 at a high probability. As a result, many errors cannot be corrected because the error correction limit of the error correction decoding unit 611 is exceeded. Unlike in the case shown in FIG. 9, when the code block mapping unit 505 maps to assign the code block to the four carriers as shown in FIG. 10, a code block error occurrence rate (to be simply referred to as an error rate) is divided into the code blocks. Hence, the error can be corrected by deinterleaving of the deinterleaving unit 610, and the error correction decoding process of the error correction decoding unit 611 at a high probability. Note that the code block error rate is expressed by the (number of error code blocks of transmitted code blocks)/(number of transmitted code blocks).

Alternatively, FIGS. 11 and 12 show a state wherein a multi-path has a small temporal variation, and errors in a specific carrier occur over some symbols. In this channel response state, as shown in FIG. 11, when the code block mapping unit 505 maps to assign the code block to the four carriers, the errors occur in most data such as the code blocks 1101, 1103, 1106, and 1108 at a high probability. As a result, many errors cannot be corrected because the error correction limit of the error correction decoding unit 611 is exceeded. Unlike in the case shown in FIG. 11, when the code block mapping unit 505 maps to assign the code block to the 16 carriers as shown in FIG. 12, a code block error rate is divided into the code blocks. Hence, the error can be corrected by deinterleaving of the deinterleaving unit 610, and the error correction decoding process of the error correction decoding unit 611 at a high probability.

As described above, since the code block mapping unit 505 changes the code block mapping pattern, the error rate changes in accordance with the channel response after error correction decoding is performed by the error correction decoding unit 611.

As described above, in the radio communication system according to the first embodiment, when the error occurs in the data symbol, the code block mapping pattern shape is changed. Accordingly, the error rate in accordance with the channel response can decrease. Hence, in the radio communication system according to the first embodiment, the retransmission count of the overall system can decrease, and the system throughput can increase without a large overhead for the processes such as estimation and feedback of the channel response, and the throughput.

Second Embodiment

Figure 13:
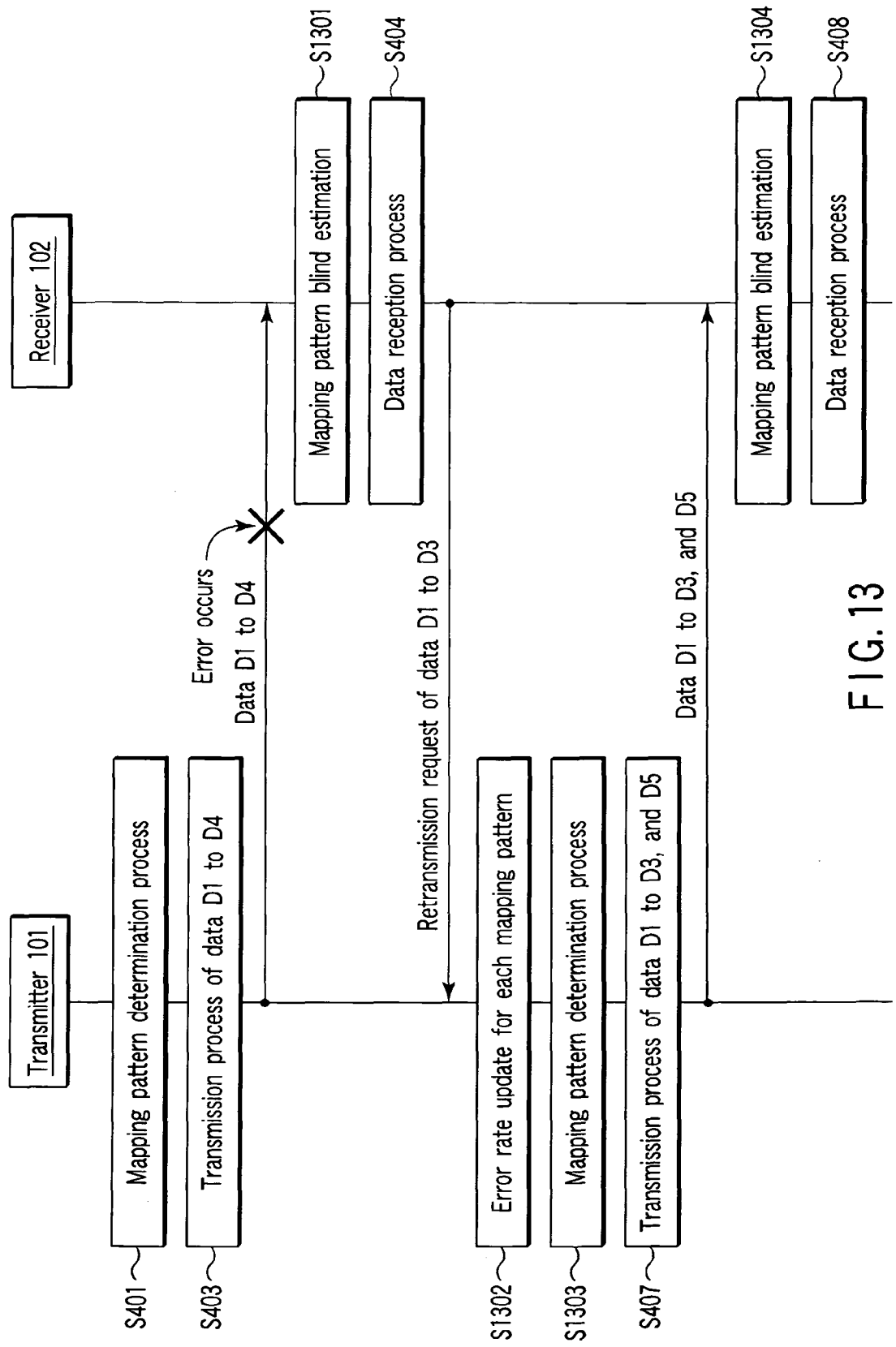
FIG. 13 is a flowchart showing an example of processes in a transmitter and a receiver according to the second embodiment of the present invention.

The processes of a transmitter 101 and a receiver 102 according to the second embodiment will be exemplified below with reference to FIG. 13. In the second embodiment, the transmitter 101 includes a database which stores an error rate for each code block mapping pattern, and updates this database every time a retransmission request is received. The receiver 102 estimates the code block mapping pattern of the data from the transmitter 101. Note that the same reference numerals as in FIG. 4 in the first embodiment denote the same steps in FIG. 13, and a description thereof will be omitted.

The transmitter 101 performs processes in steps S401 and S403. In step S401, a code block mapping pattern with the low error rate is selected from code block mapping pattern candidates obtained by negotiation between the transmitter 101 and the receiver 102 when synchronization is established. The code block mapping pattern candidates may be determined as a system in advance, or uniquely determined based on information notified from the transmitter 101 or a unique index of the receiver 102.

In this case, unlike the first embodiment, the receiver 102 does not perform a code block mapping pattern determination process.

Since the receiver 102 does not know the code block mapping pattern transmitted from the transmitter 101, the receiver 102 performs a mapping pattern blind estimation process for estimating the code block mapping pattern transmitted from the transmitter 101 (step S1301). In this estimation process, the receiver 102 estimates the code block mapping pattern used to transmit data D1 to D4 from the transmitter 101.

In this estimation process, for example, a reception process is performed using all the patterns of the code block mapping pattern candidates, and the code block mapping pattern in which no error is detected is estimated to be the code block mapping pattern used by the transmitter 101.

Assume that during data transmission from the transmitter 101 to the receiver 102, errors occur due to any reason in the code blocks D1, D2, and D3. That is, when the data reception process is performed by using the code block mapping pattern estimated in step S1301, errors are detected in the code blocks D1, D2, and D3 (step S404). The receiver 102 issues, to the transmitter 101, the retransmission request of the code blocks D1, D2, and D3 in which the errors cannot be corrected.

Upon reception of the retransmission request from the receiver 102, the transmitter 101 updates the database which stores the block error rate of the code block mapping pattern (step S1302). In accordance with the number of times of reception of the retransmission request, the transmitter 101 changes the code block mapping pattern in the code block mapping pattern determination process (step S1303). In step S1303, with reference to the preceding transmitted code block mapping pattern and the error rate for each code block mapping pattern, the code block mapping pattern used for retransmission is determined. In step S1303, for example, when the relationship between a carrier count M and a symbol count L of the preceding transmitted code block mapping pattern is expressed by M>L, a code block mapping pattern with the lowest error rate is selected from the code block mapping patterns in which the relationship between the carrier count M and the symbol count L of the code block mapping pattern to be used for retransmission is expressed by M<L. Alternatively, in step S1303, when the relationship of the preceding transmitted code block mapping pattern is expressed by M<L, a code block mapping pattern with the lowest error rate is selected from the code block mapping patterns in which the relationship between M and L of the code block mapping pattern for retransmission is expressed by M>L.

After changing the code block mapping pattern, the transmitter 101 performs a transmission process in step S407. As in processes in steps S1301 and S404, the receiver 102 performs a mapping pattern blind estimation process, and a data reception process by using a data reception process.

Figure 14:
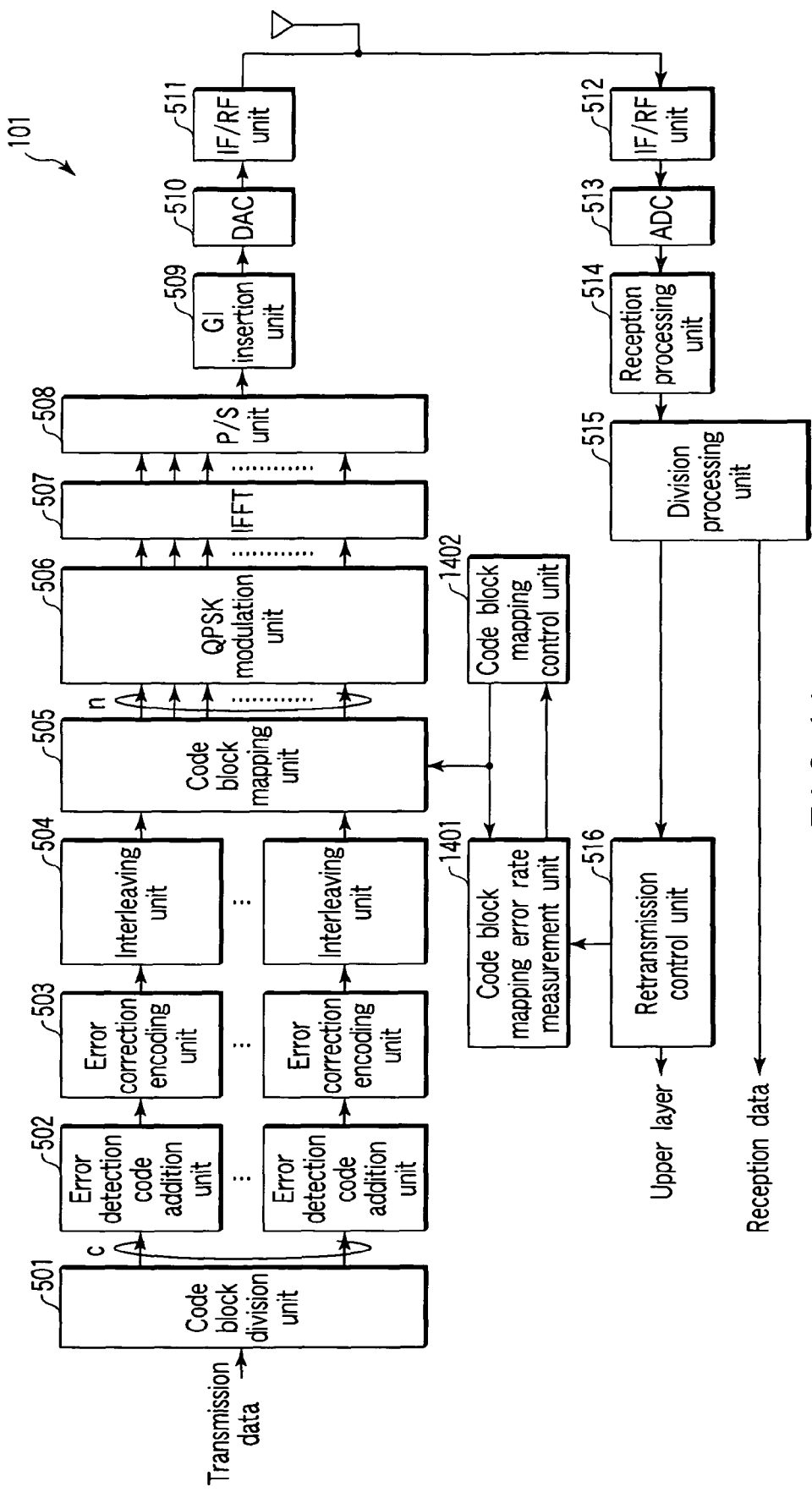
FIG. 14 is a block diagram showing the transmitter according to the second embodiment of the present invention.

The transmitter 101 according to the second embodiment will be described below with reference to FIG. 14. Note that the same reference numerals as in FIG. 5 in the first embodiment denote the same components in FIG. 14, and a description thereof will be omitted.

A code block mapping error rate measurement unit 1401 records pieces of information of the carrier count M and symbol count L in the code block used for code block mapping of a code block mapping control unit 1402, and pieces of information of the carrier count M and symbol count L and its error rate which are transmitted based on the number of the code block requested to be retransmitted by the receiver 102, while updating the pieces of information every time the retransmission request is issued.

The code block mapping control unit 1402 determines the carrier count M and symbol count L of the code block, and outputs the information of the carrier count M and symbol count L to a code block mapping unit 505. With reference to the error rate for each code block mapping pattern stored in the code block mapping error rate measurement unit 1401, the code block mapping control unit 1402 determines the carrier count M and symbol count L.

The receiver 102 according to the second embodiment will be described below with reference to FIG. 15. Note that the same reference numerals as in FIG. 4 in the first embodiment denote the same components in FIG. 15, and a description thereof will be omitted.

A buffer 1501 temporarily stores a signal which has undergone a QPSK demodulation process by the QPSK demodulation unit 608. After that, processes are performed by the respective units from a code block demapping unit 609 to an error detection unit 612. The receiver 102 repeats these processes for each code block mapping pattern candidate. That is, the receiver 102 performs the processes of the respective units from the code block demapping unit 609 to the error detection unit 612 for the possible values of M and L.

A block mapping pattern estimation unit 1502 includes a storage unit which stores all the patterns of the code block mapping pattern candidates. That is, the block mapping pattern estimation unit 1502 stores the values of M and L corresponding to each of all the code block mapping patterns.

The block mapping pattern estimation unit 1502 estimates that the code block mapping pattern with the lowest error rate of the code block mapping patterns processed in the units from the code block demapping unit 609 to the error detection unit 612 is the code block mapping pattern which has been used in transmission. When performing decoding process using this code block mapping pattern, a retransmission request processing unit 614 generates a retransmission request signal of the code block in which the error has been detected.

As described above, in the radio communication system according to the second embodiment, the transmitter selects and transmits the code block mapping pattern with the low error rate to reliably decrease the error rate. Hence, in the radio communication system according to the second embodiment, the retransmission count of the overall system can decrease, and the system throughput can increase without a large overhead for the processes such as estimation and feedback of the channel response, and the throughput.

Third Embodiment

The processes of a transmitter 101 and a receiver 102 according to the third embodiment will be exemplified below with reference to FIG. 16. In the third embodiment, the transmitter 101 includes a database which stores an error rate for each code block mapping pattern, and updates this database every time a retransmission request is received. The receiver 102 estimates the code block mapping pattern of the data from the transmitter 101. Note that the same reference numerals as in FIG. 4 in the first embodiment denote the same steps in FIG. 16, and a description thereof will be omitted.

The transmitter 101 performs processes in steps S401 and S403, and the receiver 102 performs step S402. Assume that an error occurs between the transmitter 101 and the receiver 102 due to any reason in the code blocks D1, D2, and D3, and the receiver 102 cannot correct the errors in the data in the reception process in step S404.

The error rate of the code block mapping pattern used in transmission is updated (step S1601). When the error is detected in the reception process in step S404, the receiver 102 issues a retransmission request to the transmitter 101, and determines the code block mapping pattern by using information of the error rate for each code block mapping pattern (step S1602). The receiver 102 multiplexes the retransmission request and the code block mapping pattern, and transmits the multiplexed retransmission request and the code block mapping pattern to the transmitter 101.

In the third embodiment, the retransmission request of the code blocks D1, D2, and D3 and the code block mapping pattern are multiplexed and transmitted. In step S1602, when the relationship between the carrier count M and the symbol count L of the preceding transmitted code block mapping pattern is expressed by M>L, the code block mapping pattern with the low error rate for retransmission is selected from the code block mapping patterns in which the relationship is expressed by M<L. Alternatively, when the relationship between the carrier count M and the symbol count L is expressed by M<L, the code block mapping pattern with the low error rate for retransmission is selected from the code block mapping patterns in which the relationship between the carrier count M and the symbol count L is expressed by M>L. The code block mapping pattern information fed back to the transmitter 101 may be the carrier count M and the symbol count L, or the index for uniquely determining M and L. For example, this index makes the values of M and L correspond to one numerical value. In accordance with this index, a transmission data amount can be reduced.

Upon reception of the retransmission request from the receiver 102, the transmitter 101 reads the code block mapping pattern information multiplexed with the retransmission request, and determines the code block mapping pattern (step S1603). After that, a transmission process is performed by using the code block mapping pattern obtained in step S1603 to transmit data (step S407). In this case, upon reception of the retransmission request of the code blocks D1, D2, and D3, the code blocks D1, D2, and D3, and a new data D5 are transmitted.

The receiver 102 performs a reception process for the signal from the transmitter 101 by using the code block mapping pattern obtained in step S1602 (step S408), updates an error rate update process for each code block mapping pattern in accordance with an error detection result in the reception process (step S1604), and shifts to a standby state for the next code block mapping pattern determination process.

The transmitter 101 according to the third embodiment will be described below with reference to FIG. 17. Note that the same reference numerals as in FIG. 5 in the first embodiment denote the same components in FIG. 17, and a description thereof will be omitted.

A division processing unit 1701 divides the code block mapping pattern information multiplexed with the retransmission request, and the reception data which are transmitted from the receiver 102. A code block mapping control unit 517 inputs the code block mapping pattern information, and sets the input information to the code block mapping pattern corresponding to the input information. The initial value of the code block mapping pattern is uniquely determined commonly to the receiver 102.

A retransmission control unit 1702 instructs, to an upper layer, a procedure of retransmitting the packet required to be retransmitted. Unlike a retransmission control unit 516, the retransmission control unit 1702 does not request to the code block mapping control unit 517 to change the code block mapping pattern in retransmission.

Figure 18:
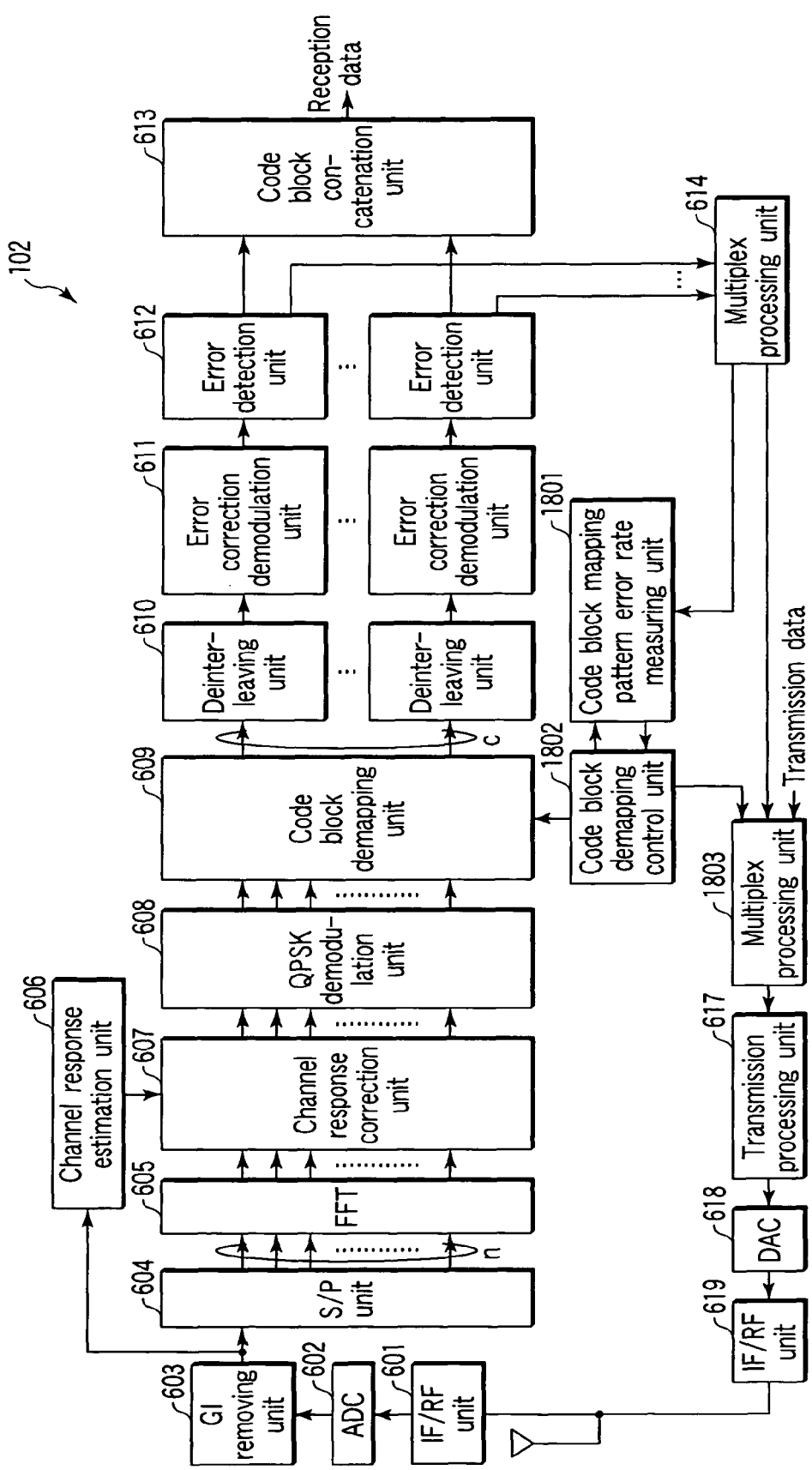
FIG. 18 is a block diagram showing the receiver according to the third embodiment of the present invention.

The receiver 102 according to the third embodiment will be described with reference to FIG. 18. Note that the same reference numerals as in FIG. 6 in the first embodiment denote the same components in FIG. 18, and a description thereof will be omitted.

A code block mapping error rate measurement unit 1801 records pieces of information of the carrier count M and symbol count L in the code block used for code block mapping of a code block demapping control unit 1802, and pieces of information of the carrier count M and symbol count L and its error rate which are transmitted based on the number of the code block requested to be retransmitted, while updating the pieces of information every time the retransmission request is issued.

The code block demapping control unit 1802 determines the carrier count M and symbol count L of the code block, and outputs the information of the carrier count M and symbol count L to a code block demapping unit 609. With reference to the error rate for each code block mapping stored in the code block demapping error rate measurement unit 1801, the code block demapping control unit 1802 determines the carrier count M and symbol count L.

A multiplex processing unit 1803 multiplexes the code block mapping pattern information and the retransmission request information together with the transmission data.

As described above, in the radio communication system according to the third embodiment, since the receiver selects the code block mapping pattern with the low error rate and feeds back the selected code block mapping pattern to the transmitter, the error rate can be reliably decreased. Hence, in the radio communication system according to the third embodiment, the retransmission count of the overall system can decrease, and the system throughput can increase without a large overhead for the process such as estimation of the channel response, and the throughput.

Fourth Embodiment

Figure 19:
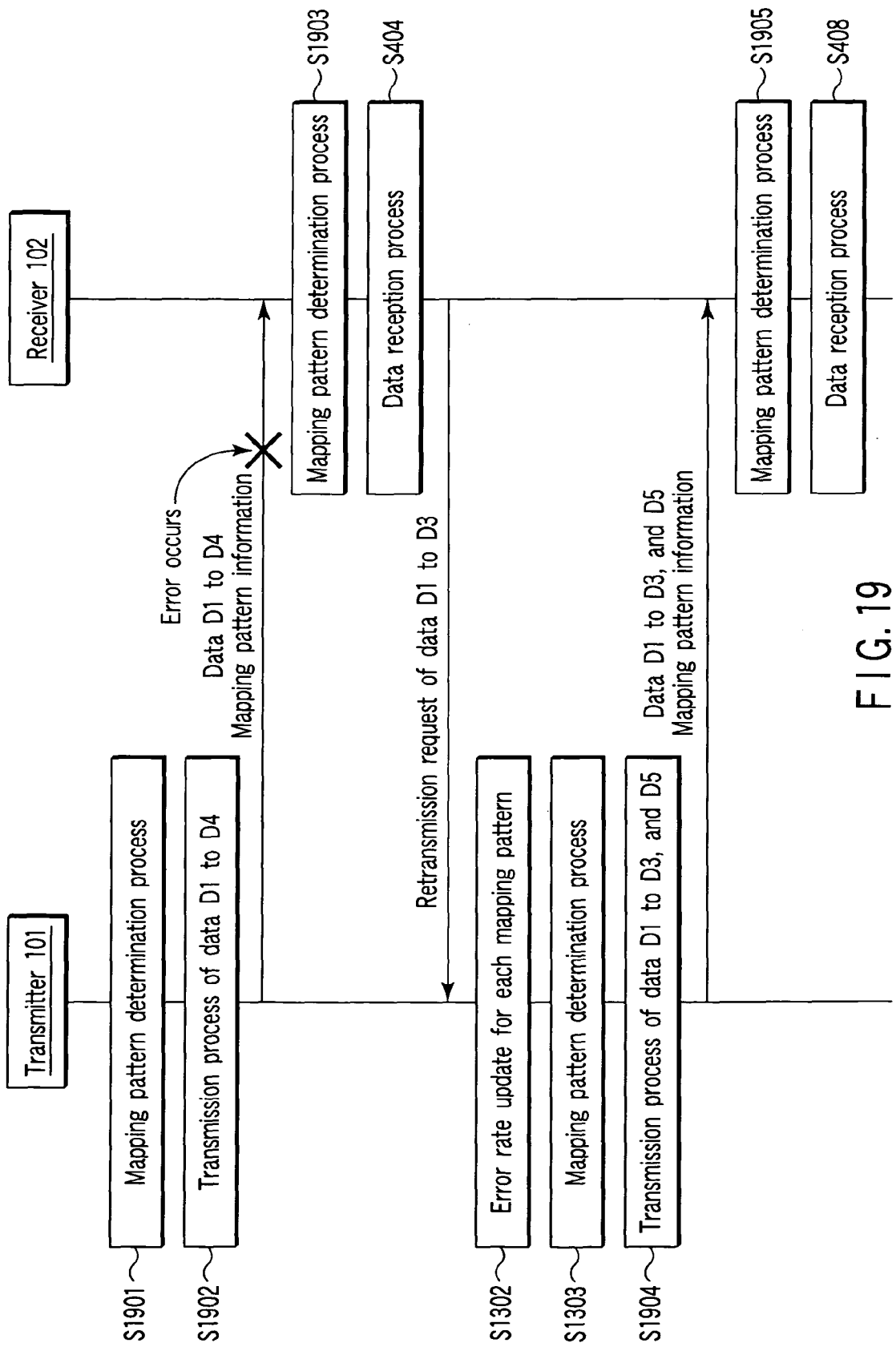
FIG. 19 is a flowchart showing an example of processes in a transmitter and a receiver according to the fourth embodiment of the present invention.

An example of the process of a transmitter 101 and a receiver 102 according to the fourth embodiment will be described below with reference to FIG. 19. In the fourth embodiment, the transmitter 101 includes a database which stores an error rate for each code block mapping pattern, and updates this database every time a retransmission request is received. The transmitter 101 transmits not only data but also its code block mapping pattern information. Note that the same reference numerals as in FIGS. 4 and 13 in the first embodiment and second embodiment denote the same steps in FIG. 19, and a description thereof will be omitted.

The transmitter 101 performs code block mapping pattern determination process (step S1901). The determined code block mapping pattern information is multiplexed to the transmission data. The multiplexed code block mapping pattern information may be a carrier count M and symbol count L, or an index for uniquely determining M and L.

The transmitter 101 then processes the transmission data in step S403 (step S1902). The transmitter 101 transmits the transmission data and the code block mapping pattern information to the receiver 102 (step S1902).

Assume that an error occurs due to any reason between the transmitter 101 and the receiver 102, and errors occur in code blocks D1, D2, and D3. The receiver 102 determines the code block mapping pattern from the multiplexed code block mapping pattern information (step S1903). Assume that errors are detected in the code blocks D1, D2, and D3 as a result of the data reception process in step S404 by using the determined code block mapping pattern. The receiver 102 issues, to the transmitter 101, the retransmission request of the code blocks D1, D2, and D3 in which the errors cannot be corrected.

Upon reception of the retransmission request from the receiver 102, the transmitter 101 performs an error rate update process for each mapping pattern in step S1302. The transmitter 101 performs a mapping pattern determination process in step S1303. After changing the code block mapping pattern, the transmitter 101 performs the transmission process for the retransmission data D1, D2, and D3, and a new data D5 to transmit the code block mapping pattern information and data to the receiver 102 (step S1904).

The receiver 102 then performs the mapping pattern determination process as in step S1903 (step S1905), and the reception process as in step S404 (step S408).

The transmitter 101 according to the fourth embodiment will be described with reference to FIG. 20. Note that the same reference numerals as in FIGS. 5 and 14 in the first embodiment and second embodiment denote the same components in FIG. 20, and a description thereof will be omitted.

A code block mapping control unit 2001 determines the carrier count M and the symbol count L of the code block, and outputs the information of the carrier count M and the symbol count L to a code block mapping unit 505. With reference to an error rate for each code block mapping stored in a code block mapping error rate measurement unit 1401, the code block mapping control unit 2001 determines the carrier count M and the symbol count L. The code block mapping pattern information containing the information of the carrier count M and the symbol count L is output to a transmission processing unit 2002.

The transmission processing unit 2002 performs the transmission process for the code block mapping pattern information output from the code block mapping control unit 2001. This transmission process includes processes such as error detection code addition, error correction encoding, interleaving, modulation, and the like.

A multiplex processing unit 2003 multiplexes the transmission data output from a GI insertion unit 509, and the code block mapping pattern information output from the transmission processing unit 2002. The multiplex processing unit 2003 multiplexes data by time division multiplexing, frequency multiplexing, or diffusion code multiplexing, or specified carrier mapping.

The receiver 102 according to the fourth embodiment will be described below with reference to FIG. 21. Note that the same reference numerals as in FIG. 6 in the first embodiment denote the same components in FIG. 21, and a description thereof will be omitted.

A division processing unit 2101 divides the data received from the transmitter 101 into a data portion and a data portion containing the code block mapping pattern information. The division processing unit 2101 can employ any division scheme as far as the division scheme corresponds to that of the multiplex processing unit 2003 of the transmitter 101. The division processing unit 2101 outputs the data portion to a GI removing unit 603, and outputs the data portion containing the code block mapping pattern information to a reception processing unit 2102.

The reception processing unit 2102 obtains the code block mapping pattern information from the data portion containing the code block mapping pattern information. The reception processing unit 2102 can employ any processing scheme as far as the processing scheme corresponds to that of the transmission processing unit 2002 of the transmitter 101. The reception processing unit 2102 performs processes such as channel response estimation, channel response correction, demodulation, deinterleaving, error correction decoding, error detection, and the like.

A code block demapping control unit 2103 determines the code block mapping pattern based on the code block mapping pattern information obtained by the reception processing unit 2102. The determined code block mapping pattern is output to a code block demapping unit 609.

As described above, in a radio communication system according to the fourth embodiment, the transmitter selects the code block mapping pattern with the low error rate, and multiplexes the selected code block mapping pattern with the code block mapping pattern information to transmit data. Accordingly, the error rate can be decreased reliably. Hence, in the radio communication system according to the fourth embodiment, the retransmission count of the overall system can decrease, and the system throughput can increase without a large overhead for the processes such as estimation and feedback of the channel response, and the throughput.

The above-described radio communication system according to the fourth embodiment is effective for a radio communication scheme using a frequency-divided multi-carrier. The above-described radio communication system according to the fourth embodiment is also effective for a radio communication scheme using OFDM in a forward link.

Fifth Embodiment

Figure 22:
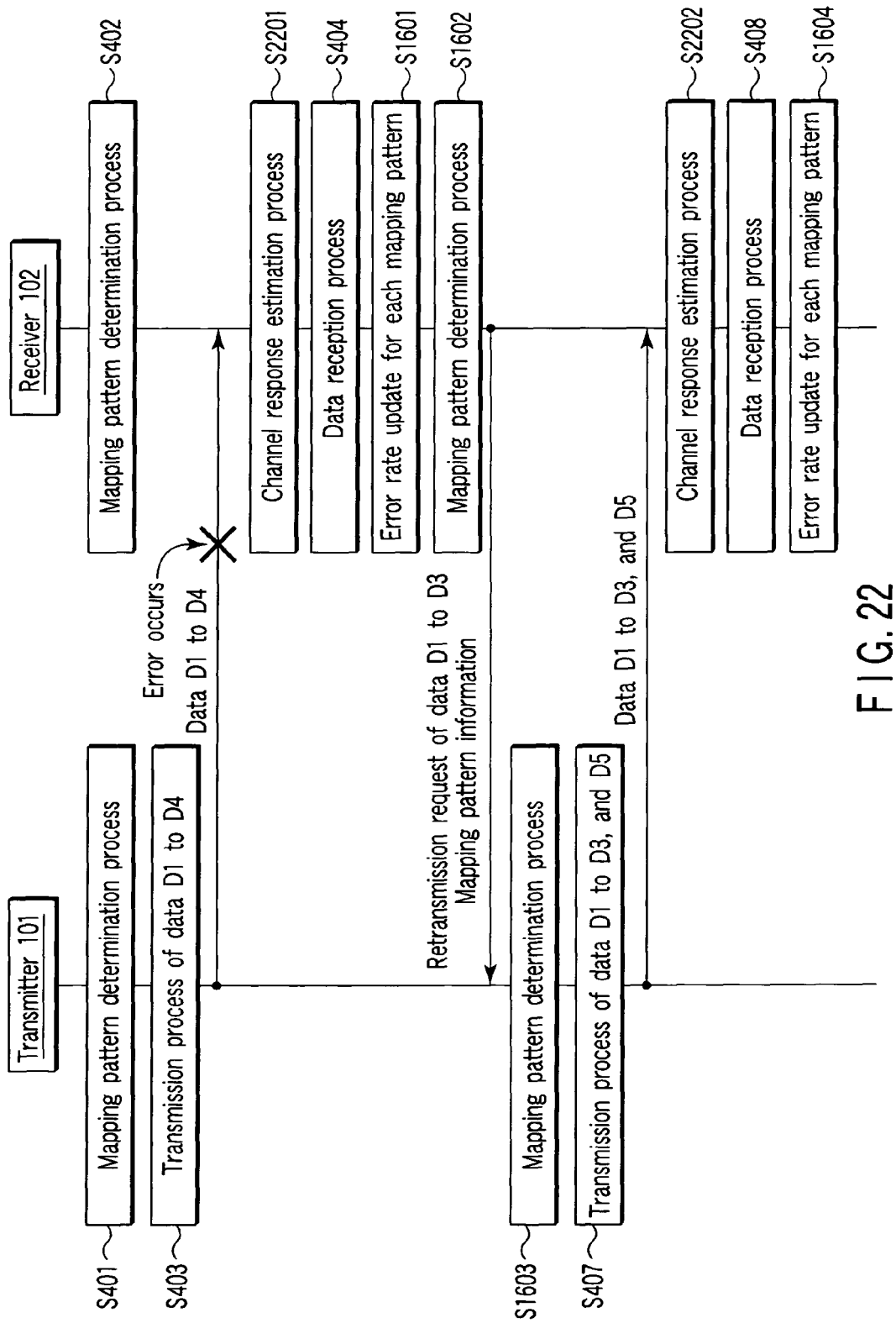
FIG. 22 is a flowchart showing an example of processes in a transmitter and a receiver according to the fifth embodiment of the present invention.

FIG. 22 shows the processes of a transmitter and a receiver according to the fifth embodiment. Note that the same reference numerals as in FIGS. 4 and 16 in the first embodiment and third embodiment denote the same steps in FIG. 22, and a description thereof will be omitted.

Figure 16:
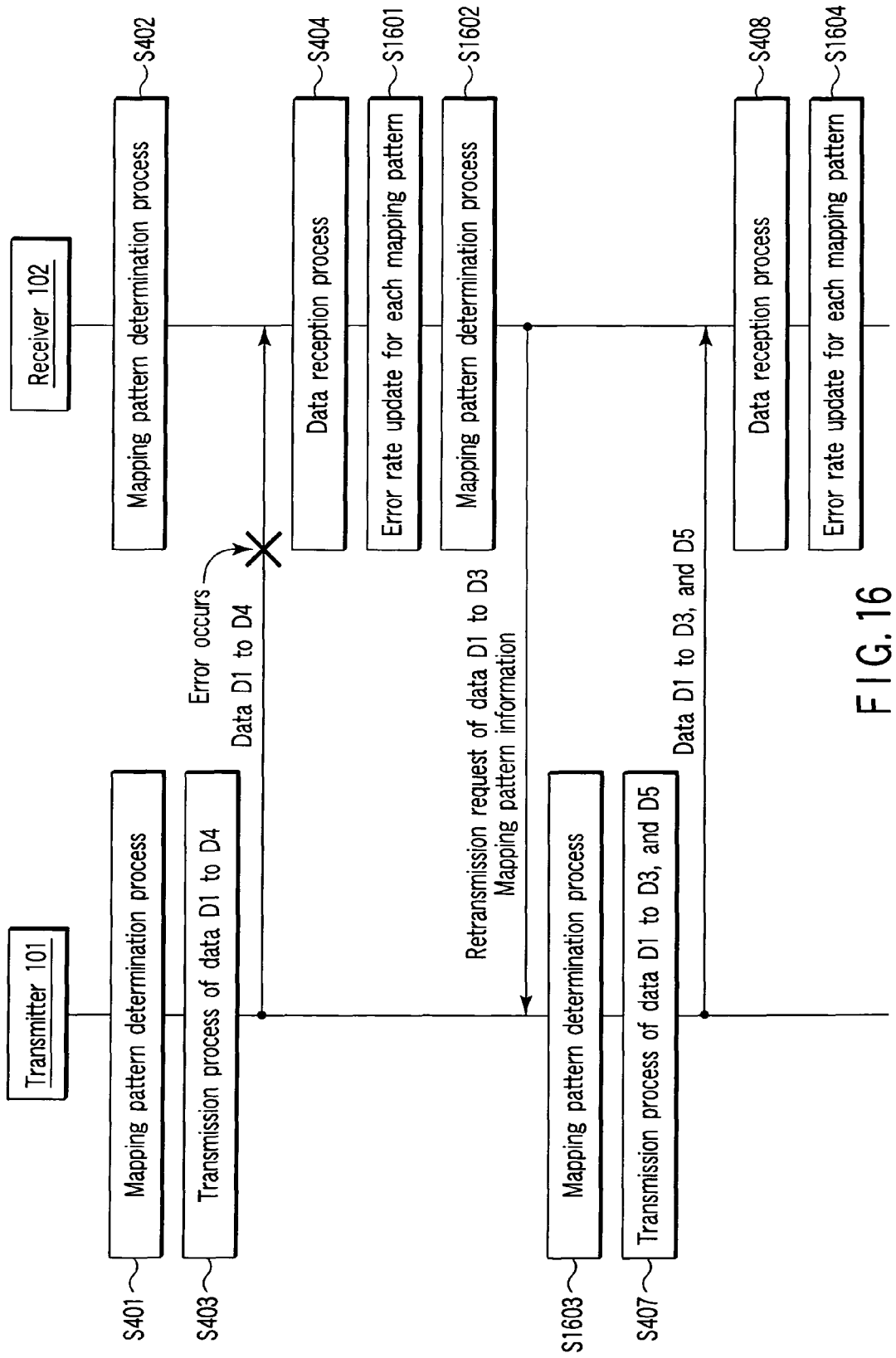
FIG. 16 is a flowchart showing an example of processes in a transmitter and a receiver according to the third embodiment of the present invention.

The process of a transmitter 101 is the same as that in the third embodiment shown in FIG. 16. The process of the receiver in the fifth embodiment is different from that in the third embodiment in that a channel response estimation process (step S2201) is performed for performing a mapping pattern determination process (step S1602). In third embodiment, the channel response estimation process for performing the data reception process is also performed, but the result of the channel response estimation process is not used for the mapping pattern determination process.

FIG. 23 shows an arrangement of the receiver in the fifth embodiment. Note that the same reference numerals as in FIGS. 6 and 18 in the first embodiment and third embodiment denote the same components in FIG. 23, and a description thereof will be omitted. The receiver arrangement of the fifth embodiment is different from that (FIG. 18) of the third embodiment in that a channel response estimation result obtained by a channel response estimation unit 606 is used not only for the channel response correction unit 607 but also for a code block demapping control unit 2301. In consideration of the code block error rate obtained by a code block mapping pattern error rate measuring unit 1801, the code block demapping control unit 2301 determines code block mapping pattern candidates to be used in retransmission. Additionally, a proper code block mapping pattern is selected from the code block mapping pattern candidates by using information from the channel response estimation unit 606. For example, as a result of channel response estimation, if it is determined that the channel response is a channel response shown in FIGS. 7 and 8, the code block mapping pattern with a low temporal spread is selected with high priority to decrease the error rate. If it is determined that the channel response is a channel response shown in FIGS. 9 and 10, the code block mapping pattern with a high spread in a frequency direction is selected with high priority to decrease the error rate.

Note that the arrangement of the transmitter 101 according to the fifth embodiment is the same as that of the transmitter 101 according to the third embodiment shown in FIG. 17.

As described above, the radio communication system in the fifth embodiment is constructed, and the receiver uses the channel response estimation result to determine the code block mapping pattern. Hence, the code block mapping pattern suitable for the current channel response can be selected. Therefore, the error rate in retransmission can be decreased, the retransmission count of the overall system can be decreased, and the system throughput can increase in the radio communication system.

Sixth Embodiment

FIG. 24 shows an example of the processes of a transmitter 101 and a receiver 102 according to the sixth embodiment. Note that the same reference numerals as in FIGS. 4 and 13 in the first embodiment and second embodiment denote the same steps in FIG. 24, and a description thereof will be omitted.

The sixth embodiment is different from the fourth embodiment in that the product of M×L (M is the carrier count, and L is the symbol count) in the code block mapping pattern for each data slot, a modulation scheme, an error correction method, and an encoding rate are not constant, and a data transmission speed is variable. In this case, as shown in FIG. 24, an MCS (modulation scheme, encoding method, and encoding rate) is determined (step S2401) in addition to the code block mapping pattern. The mapping pattern and MCS information which are multiplexed with data must be notified from the transmitter 101 to the receiver 102 in a transmission process (step S2402) using the determined MCS. In the receiver, since the mapping pattern and the MCS are demultiplexed to perform the reception process, the mapping pattern and the MCS information to be used for the data portion reception process are determined (step S2403).

Figure 25:
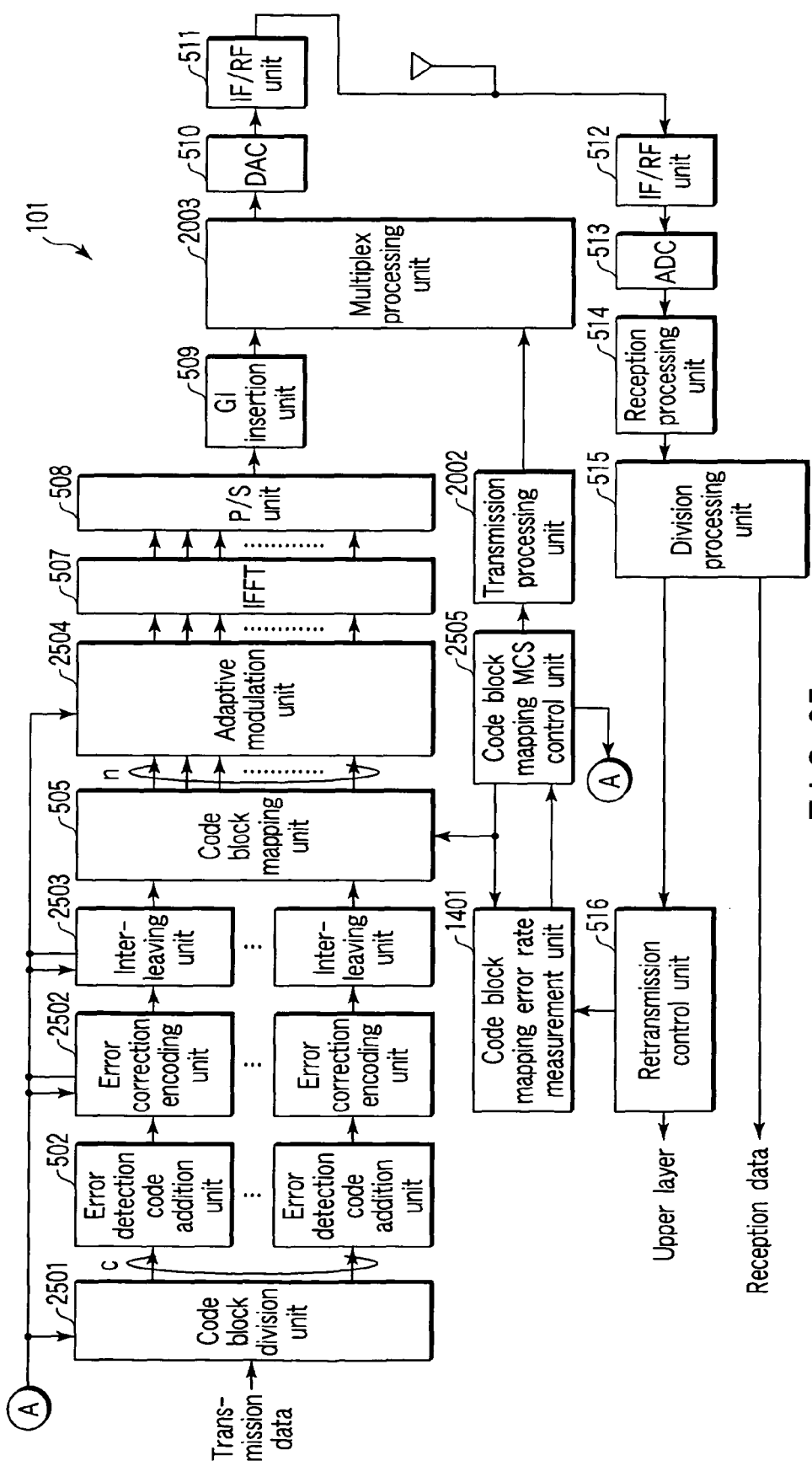
FIG. 25 is a block diagram showing a transmitter configuration according to the sixth embodiment of the present invention.

FIG. 25 shows an arrangement of the transmitter 101 according to the sixth embodiment. Note that the same reference numerals as in FIGS. 5, 14, and 20 in the first embodiment, second embodiment, and fourth embodiment denote the same components in FIG. 25, and a description thereof will be omitted.

The arrangement in FIG. 25 is different from that shown in FIG. 20 in that a code block mapping MCS control unit 2505 determines the code block mapping pattern in correspondence with the result obtained by a code block error rate measurement unit 1401. A divided code block count and bit count, the encoding scheme and encoding rate, an interleave length, the modulation scheme are determined and respectively notified to a code block division unit 2501, error correction encoding processing unit 2502, interleaving unit 2503, and adaptive modulation unit 2504. These pieces of information are multiplexed with the data, and notified to the receiver. These units perform the data transmission process based on the information obtained by the code block mapping MCS control unit 2505.

Figure 26:
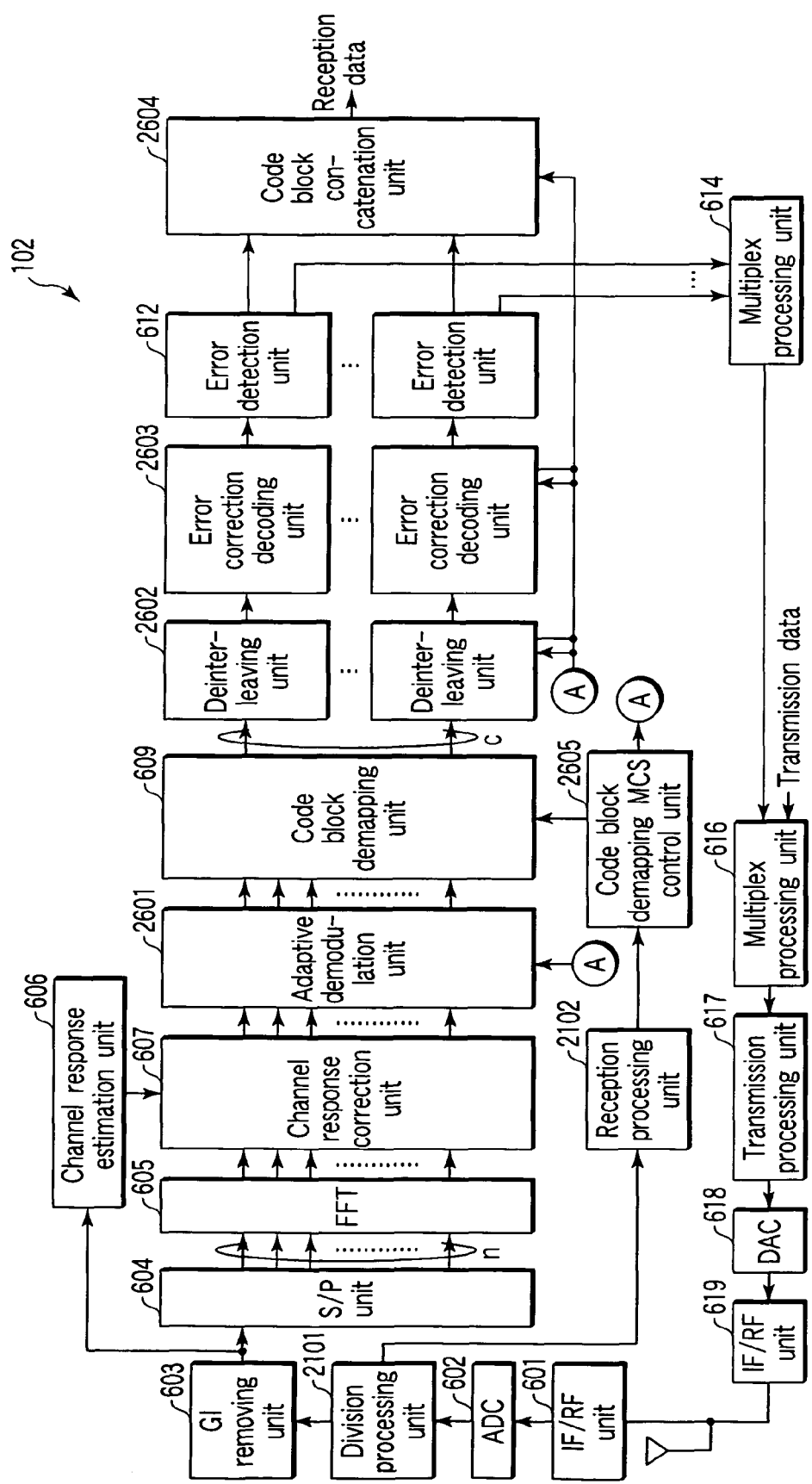
FIG. 26 is a block diagram showing a receiver configuration according to the sixth embodiment of the present invention.

FIG. 26 shows an arrangement of the receiver 102 according to the sixth embodiment. Note that the same reference numerals as in FIGS. 6 and 21 in the first embodiment and fourth embodiment denote the same components in FIG. 26, and a description thereof will be omitted.

The arrangement in FIG. 26 is different from that in FIG. 21 in that the MCS information for the data reception process is obtained by separating the MCS information in addition to the code block mapping pattern multiplexed by the transmitter, and performing the reception process. A code block demapping MCS control unit 2605 notifies the code block demapping unit 609 of the information of the carrier count M and symbol count L of the code block mapping pattern, and respectively notifies an adaptive demodulation unit 2601, deinterleaving unit 2602, error correction decoding unit 2603, and code block concatenation unit 2604 of the modulation scheme, interleaving length, encoding scheme and encoding rate, and division code block count and bit count. These units perform data reception process based on the information obtained by the code block demapping MCS control unit 2605.

As described above, in the sixth embodiment, a system is constructed, in which the product of M×L (M is the carrier count, and L is the symbol count) in the code block, the modulation scheme, the error correction method, and the encoding rate are not predetermined, and the data transmission speed is variable. As a result, channel responses can be flexibly processed. Accordingly, a radio communication system can be implemented in which the error rate in retransmission can decrease, a retransmission count in an overall system can be reduced, and a system throughput increases.

The above-described embodiments of the present invention can be applied to a cellular or radio LAN as far as the radio communication system employs the multi-carrier. Furthermore, the embodiments of the present invention can also be applied to a part of IEEE 802.16 and UWB.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system, comprising:
a radio transmitter, comprising:
a division unit configured to divide transmission data into a plurality of first code blocks each having N-bit data (N is an integer of not less than 1);
an addition unit configured to add a plurality of error detection codes to the first code blocks, respectively;
an assignment unit configured to assign the first code blocks to a plurality of second code blocks each including M (M is an integer of not less than 1 and not more than a carrier count) carriers each having L (L is an integer of not less than 1) symbols; and
a transmission unit configured to transmit the second code blocks to which the first code blocks are assigned; and
a radio receiver, comprising:
a reception unit configured to receive the second code blocks transmitted by the transmission unit;
a conversion unit configured to convert the received second code blocks into the first code blocks to which the error detection codes are added, based on first values of M and L;
a correction decoding unit configured to subject the first coded blocks obtained by the conversion unit to error correction decoding;
a detection unit configured to detect an error of at least one code block of the first code blocks subjected to the error correction decoding;
a generation unit configured to generate a retransmission request signal for requesting a retransmission of the code block including the error, if the error is detected by the detection unit; and
a transmission unit configured to transmit the retransmission request signal; and
the radio transmitter further comprising:
a reception unit configured to receive the retransmission request signal from the radio receiver;
a calculation unit configured to calculate an error rate indicating an error detection degree in the code block in correspondence with the first values of M and L based on the retransmission request signal;
an error rate storage unit configured to store the error rate in correspondence with the first values of M and L; and
a change unit configured to change the first values of M and L to second values of M and L corresponding to the code block with an error rate lower than the error rate corresponding to the first values of M and L, with reference to the stored error rate,
wherein the radio receiver further comprises:
a code block storage unit configured to store the received code blocks;
a candidate storage unit configured to store a plurality of candidates of values of M and L;

a selection unit configured to select given values of M and L from the values of M and L; and an estimation unit configured to, based on the selected values of M and L, cause the conversion unit to convert the second code blocks into the first code blocks, cause the correction decoding unit to subject the first code blocks to the error correction decoding, and if the detection unit fails to detect an error in the first code blocks having subjected to the error correction decoding, estimate that the values of M and L are the values of M and L of the second code blocks assigned by the radio transmitter.

2. A radio communication system, comprising:

a radio transmitter, comprising:

a division unit configured to divide transmission data into a plurality of first code blocks each having N-bit data (N is an integer of not less than 1);

an addition unit configured to add a plurality of error detection codes to the first code blocks, respectively;

an assignment unit configured to assign the first code blocks to a plurality of second code blocks each including M (M is an integer of not less than 1 and not more than a carrier count) carriers each having L (L is an integer of not less than 1) symbols; and a transmission unit configured to transmit the second code blocks to which the first code blocks are assigned; and a radio receiver, comprising:

a reception unit configured to receive the second code blocks transmitted by the transmission unit;

a conversion unit configured to convert the received second code blocks into the first code blocks to which the error detection codes are added, based on first values of M and L;

a correction decoding unit configured to subject the first coded blocks obtained by the conversion unit to error correction decoding;

a detection unit configured to detect an error of at least one code block of the first code blocks subjected to the error correction decoding;

a generation unit configured to generate a retransmission request signal for requesting a retransmission of the code block including the error, if the error is detected by the detection unit; and a transmission unit configured to transmit the retransmission request signal; and the radio transmitter further comprising:

a reception unit configured to receive the retransmission request signal from the radio receiver;

a calculation unit configured to calculate an error rate indicating an error detection degree in the code block in correspondence with the first values of M and L based on the retransmission request signal;

an error rate storage unit configured to store the error rate in correspondence with the first values of M and L; and a change unit configured to change the first values of M and L to second values of M and L corresponding to the code block with an error rate lower than the error rate corresponding to the first values of M and L, with reference to the stored error rate, wherein the radio receiver further comprises:

a code block storage unit configured to store the received code block;

a candidate storage unit configured to store a plurality of candidates of values of M and L;

a selection unit configured to select given values of M and L from the values of M and L; and an estimation unit configured to, based on the selected values of M and L, cause the conversion unit to convert the second code blocks into the first code blocks, and when causing the correction decoding unit to subject the first code blocks to the error correction decoding, estimate that the values of M and L with a lowest error rate are the values of M and L of the second code block assigned by the radio transmitter.

3. A radio communication system, comprising:

a radio transmitter, comprising:

a division unit configured to divide transmission data into a plurality of first code blocks each having N-bit data (N is an integer of not less than 1);

an addition unit configured to add a plurality of error detection codes to the first code blocks, respectively;

an assignment unit configured to assign the first code blocks to a plurality of second code blocks each including M (M is an integer of not less than 1 and not more than a carrier count) carriers each having L (L is an integer of not less than 1) symbols; and a transmission unit configured to transmit the second code blocks to which the first code blocks are assigned; and a radio receiver, comprising:

a reception unit configured to receive the second code blocks transmitted by the transmission unit;

a conversion unit configured to convert the received second code blocks into the first code blocks to which the error detection codes are added, based on first values of M and L;

a correction decoding unit configured to subject the first coded blocks obtained by the conversion unit to error correction decoding;

a detection unit configured to detect an error of at least one code block of the first code blocks subjected to the error correction decoding;

a generation unit configured to generate a retransmission request signal for requesting a retransmission of the code block including the error, if the error is detected by the detection unit; and a transmission unit configured to transmit the retransmission request signal; and the radio transmitter further comprising:

a reception unit configured to receive the retransmission request signal from the radio receiver;

a calculation unit configured to calculate an error rate indicating an error detection degree in the code block in correspondence with the first values of M and L based on the retransmission request signal;

an error rate storage unit configured to store the error rate in correspondence with the first values of M and L; and a change unit configured to change the first values of M and L to second values of M and L corresponding to the code block with an error rate lower than the error rate corresponding to the first values of M and L, with reference to the stored error rate, wherein:

the radio receiver further comprises a transmission unit configured to transmit code block mapping pattern information containing the values of M and L changed by the change unit, the radio transmitter further comprises a reception unit configured to receive the transmitted code block mapping pattern information, and the conversion unit converts the second code blocks into first code blocks, based on the values of M and L contained in the second code block mapping pattern information.

4. A radio communication system, comprising:
a radio transmitter, comprising:
a division unit configured to divide transmission data into a plurality of first code blocks each having N-bit data (N is an integer of not less than 1);
an addition unit configured to add a plurality of error detection codes to the first code blocks, respectively;
an assignment unit configured to assign the first code blocks to a plurality of second code blocks each including M (M is an integer of not less than 1 and not more than a carrier count) carriers each having L (L is an integer of not less than 1) symbols; and
a transmission unit configured to transmit the second code blocks to which the first code blocks are assigned; and
a radio receiver, comprising:
a reception unit configured to receive the second code blocks transmitted by the transmission unit;
a conversion unit configured to convert the received second code blocks into the first code blocks to which the error detection codes are added, based on first values of M and L;
a correction decoding unit configured to subject the first coded blocks obtained by the conversion unit to error correction decoding;
a detection unit configured to detect an error of at least one code block of the first code blocks subjected to the error correction decoding;
a generation unit configured to generate a retransmission request signal for requesting a retransmission of the code block including the error, if the error is detected by the detection unit; and
a transmission unit configured to transmit the retransmission request signal; and
the radio transmitter further comprising:
a reception unit configured to receive the retransmission request signal from the radio receiver;
a calculation unit configured to calculate an error rate indicating an error detection degree in the code block in correspondence with the first values of M and L based on the retransmission request signal;
an error rate storage unit configured to store the error rate in correspondence with the first values of M and L; and
a change unit configured to change the first values of M and L to second values of M and L corresponding to the code block with an error rate lower than the error rate corresponding to the first values of M and L, with reference to the stored error rate,
wherein:
the radio transmitter further comprises a transmission unit configured to transmit code block mapping pattern information containing the values of M and L changed by the change unit,
the radio receiver further comprises a reception unit configured to receive the transmitted code block mapping pattern information, and
the conversion unit converts the second code blocks into first code blocks, based on the values of M and L contained in the second code block mapping pattern information.

* * * * *